(12) United States Patent
Tamada et al.

(10) Patent No.: US 11,456,119 B2
(45) Date of Patent: Sep. 27, 2022

(54) ELECTROLYTIC CAPACITOR WITH IMPROVED CONNECTION PART

(71) Applicant: TDK Electronics AG, Munich (DE)

(72) Inventors: Taku Tamada, Hita (JP); Joe Liu, Xiamen (CN); Jonathan Zhao, Xiamen (CN)

(73) Assignee: TDK ELECTRONICS AG, Munich (DE)

( * ) Notice: Subject to any disclaimer, the term of this patent is extended or adjusted under 35 U.S.C. 154(b) by 0 days.

(21) Appl. No.: 17/040,382

(22) PCT Filed: Apr. 6, 2018

(86) PCT No.: PCT/EP2018/058896
§ 371 (c)(1),
(2) Date: Sep. 22, 2020

(87) PCT Pub. No.: WO2019/192726
PCT Pub. Date: Oct. 10, 2019

(65) Prior Publication Data
US 2021/0057165 A1 Feb. 25, 2021

(51) Int. Cl.
*H01G 9/008* (2006.01)
*H01G 9/00* (2006.01)
*H01G 9/10* (2006.01)
*H01R 4/06* (2006.01)

(52) U.S. Cl.
CPC ........... *H01G 9/008* (2013.01); *H01G 9/0029* (2013.01); *H01G 9/10* (2013.01); *H01R 4/06* (2013.01)

(58) Field of Classification Search
CPC ................................ H01G 9/008; H01G 9/10
See application file for complete search history.

(56) References Cited

U.S. PATENT DOCUMENTS

| 4,456,945 A | 6/1984 | Shedigian |
| 6,064,563 A | 5/2000 | Yamada et al. |
| 2004/0095709 A1 | 5/2004 | Hata et al. |
| 2005/0168911 A1 | 8/2005 | Staib |

FOREIGN PATENT DOCUMENTS

| CN | 1205797 A | 1/1999 |
| CN | 1428801 A | 7/2003 |
| CN | 1650376 A | 8/2005 |
| CN | 201532855 U | 7/2010 |
| CN | 102412066 A | 4/2012 |
| CN | 202275720 U | 6/2012 |
| CN | 103137343 A | 6/2013 |

(Continued)

*Primary Examiner* — Eric W Thomas
(74) *Attorney, Agent, or Firm* — Slater Matsil, LLP

(57) ABSTRACT

In an embodiment an electrolytic capacitor includes a capacitor element being housed by a can. A covering element is configured to close an opening of the can. A connection element comprises an external terminal for applying an electrical signal and a lead tab being electrically coupled to the capacitor element and to the external terminal. The connection element comprises an upper washer and a lower washer respectively having an opening to receive a rivet to fix the external terminal and the lead tab to the covering element. The upper washer is configured to either comprise a cavity to receive a head of the rivet or a protrusion or a tapered lateral surface.

18 Claims, 17 Drawing Sheets

(56) References Cited

FOREIGN PATENT DOCUMENTS

| | | | | |
|---|---|---|---|---|
| JP | 2000113865 A | | 4/2000 | |
| JP | 2002299188 A | | 10/2002 | |
| JP | 2004087892 A | * | 3/2004 | ............... H01G 9/08 |
| JP | 2008053280 A | | 3/2008 | |
| JP | 2008227265 A | | 9/2008 | |
| JP | 2009246287 A | | 10/2009 | |
| JP | 2011204725 A | | 10/2011 | |
| JP | 2012074643 A | * | 4/2012 | |
| JP | 2014072273 A | * | 4/2014 | ............. H01G 4/228 |

* cited by examiner

ELECTROLYTIC CAPACITOR WITH IMPROVED CONNECTION PART

This patent application is a national phase filing under section 371 of PCT/EP2018/058896, filed Apr. 6, 2018, of which is incorporated herein by reference in its entirety.

TECHNICAL FIELD

The invention relates to an electrolytic capacitor with an improved connection part used to externally apply a signal to the electrolytic capacitor. The invention further relates to a method to manufacture an electrolytic capacitor with an improved connection part to externally apply a signal to the electrolytic capacitor.

BACKGROUND

An electrolytic capacitor, for example, an aluminium electrolytic capacitor, comprises a winding which is impregnated with an electrolyte solution. The impregnated winding is arranged within a can having an opening to insert the winding. The can is closed by a seal material, for example a cover disc. An external terminal to apply a signal to the electrolytic capacitor is fixed at the outer surface of the cover disc. A lead tab is fixed to the inner surface of the cover disc to electrically couple the winding of the electrolytic capacitor with the external terminal.

In most of the manufacturing procedures, the aluminium electrolytic capacitors of Snap-In type and Lug-terminal type which is mainly used in flash are produced based on cold welding (riveting) to connect the lead tab with the cover disc to save manufacturing costs. Washers are provided between the inner surface of the covering element and a head of a rivet to fix the lead tab to the cover disc. In particular, an upper washer is arranged between the head of the rivet and the lead tab. The upper washer is used in the riveting process and it exists for fixing the lead tab and keeping the good electrical contact in the life time of the capacitor. A lower washer arranged between the inner surface of the cover disk and the lead tab is provided to fix the rivet and the external terminal on the cover disc.

During the use of the capacitor, when residual electrolyte solution may come out from the winding and enter into the gaps among the rivet, the upper washer and the lead tab. As a consequence, an oxide membrane/layer will be generated on the surface of the rivet, the upper washer and the lead tab in the gaps by electric current. The oxide membrane/layer causes contact failures at the connection part.

SUMMARY

Embodiments provide an electrolytic capacitor with an improved connection part to prevent the development of an oxide layer on the surface of components of the connection part to avoid contact failures at the connection part. Further embodiments provide a method to manufacture an electrolytic capacitor with an improved connection part which allows preventing the development of an oxide layer on the surface of components of the connection part to avoid contact failures at the connection part.

According to an embodiment of an electrolytic capacitor with an improved connection part to prevent the development of an oxide layer on the surface of components of the connection part to avoid contact failures, the electrolytic capacitor comprises a can having an opening, a capacitor element being housed by the can and a covering element being arranged to close the opening of the can. The covering element has an inner surface directed to the inside of the can and an opposite outer surface directed to the outside of the can. The electrolytic capacitor further comprises a connection element for externally applying an electrical signal to the capacitor element. The connection element comprises an external terminal for applying the electrical signal and a lead tab being electrically coupled to the capacitor element and the external terminal. The connection element comprises a rivet having a first and a second head. The rivet penetrates the covering element so that the first head of the rivet protrudes out of the covering element at the inner surface of the covering element, and the second head of the rivet protrudes out of the covering element at the outer surface of the covering element. The rivet is configured such that the first head of the rivet fixes the lead tab to the covering element at the inner surface of the covering element and the second head of the rivet fixes the external terminal to the covering element at the outer surface of the covering element.

The connection element comprises an upper washer and a lower washer respectively having an opening to receive the rivet. The upper washer is placed between the lead tab and the first head of the rivet, and the lower washer is placed between the lead tab and the inner surface of the covering element. The upper washer is formed having a first surface directed to the inside of the can, a second surface being located opposite to the first surface and directed to the inner surface of the covering element and a third surface laterally located between the first and the second surface of the upper washer.

The upper washer is configured such that either the first surface of the upper washer comprises a cavity to receive the first head of the rivet or the second surface of the upper washer comprises a protrusion or the third surface of the upper washer is formed with a taper such that the second surface has a larger area than the first surface of the upper washer.

The embodiment of the electrolytic capacitor allows reducing any gaps among the rivet, the lead tab and the upper washer to prevent immersion of electrolyte/water and to avoid the development of an oxide layer on the surface of the rivet, the lead tab and the upper washer. Therefore, the electrolytic capacitor allows resolving any contact failure between the lead tab and the rivet caused by immersion of electrolyte/water to gaps and oxidation of connection materials.

According to an embodiment of a method of manufacturing an electrolytic capacitor with an improved connection part to prevent the development of an oxide layer on the surface of components of the connection part to avoid contact failures, the method comprises the steps of: providing a can having an opening, providing a capacitor element, providing a covering element to close the opening of the can, the covering element having an inner surface directed to the inside of the can and an opposite outer surface directed to the outside of the can when closing the can, providing a connection element for externally applying an electrical signal to the capacitor element, wherein the connection element comprises an external terminal for applying the electrical signal and a lead tab for applying the electrical signal to the capacitor element and a rivet having a first and a second head, wherein the rivet penetrates the covering element so that the first head of the rivet protrudes out of the covering element at the inner surface of the covering element and the second head of the rivet protrudes out of the covering element at the outer surface of the covering element, wherein the rivet is configured such that the first head of the rivet fixes the lead tab to the covering element at the inner surface of the covering element and the second head of the rivet fixes the terminal to the covering element at the outer surface of the covering element, wherein the connection element comprises an upper washer and a lower washer respectively having an opening to receive the rivet, wherein the upper washer is placed between the lead tab and the first head of the rivet and the lower washer is placed between the lead tab and the inner surface of the covering element, wherein the upper washer is formed having a first surface directed to the inside of the can, a second surface being located opposite to the first surface and directed to the inner surface of the covering element and a third surface laterally located between the first and the second surface of the upper washer, wherein the upper washer is configured such that either the first surface of the upper washer comprises a cavity to receive the first head of the rivet or the second surface of the upper washer comprises a protrusion or the third surface is formed with a taper such that the second surface of the upper washer has a larger area than the first surface of the upper washer, inserting the capacitor element into the opening of the can, and closing the opening of the can by means of the covering element.

Further embodiments of the electrolytic capacitor and the method to manufacture the electrolytic capacitor are specified in the claims.

DETAILED DESCRIPTION OF ILLUSTRATIVE EMBODIMENTS

Figure 1A:
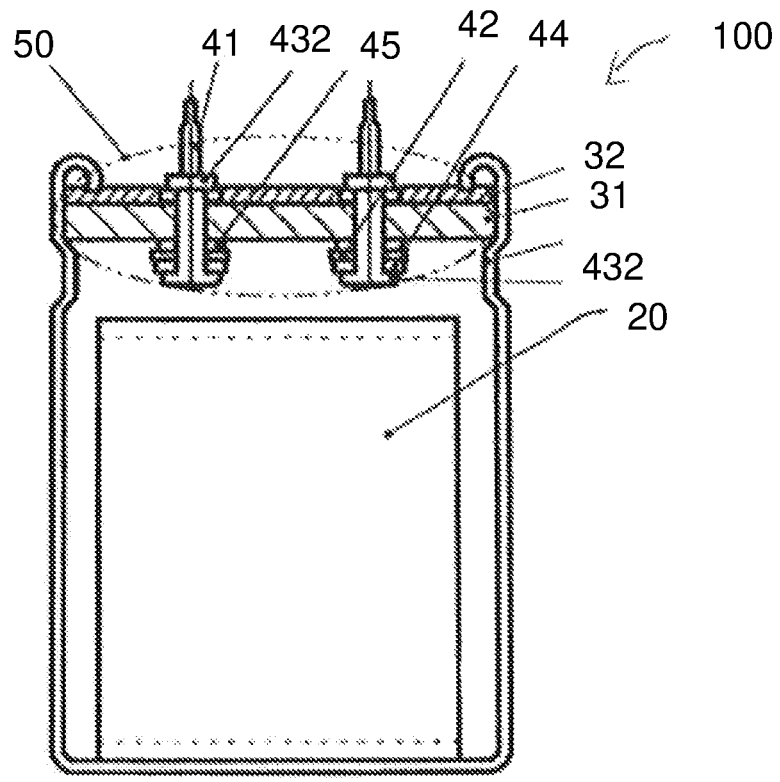
FIG. 1A shows a sectional view of the structure of an embodiment of an electrolytic capacitor from a first side.
Figure 1B:
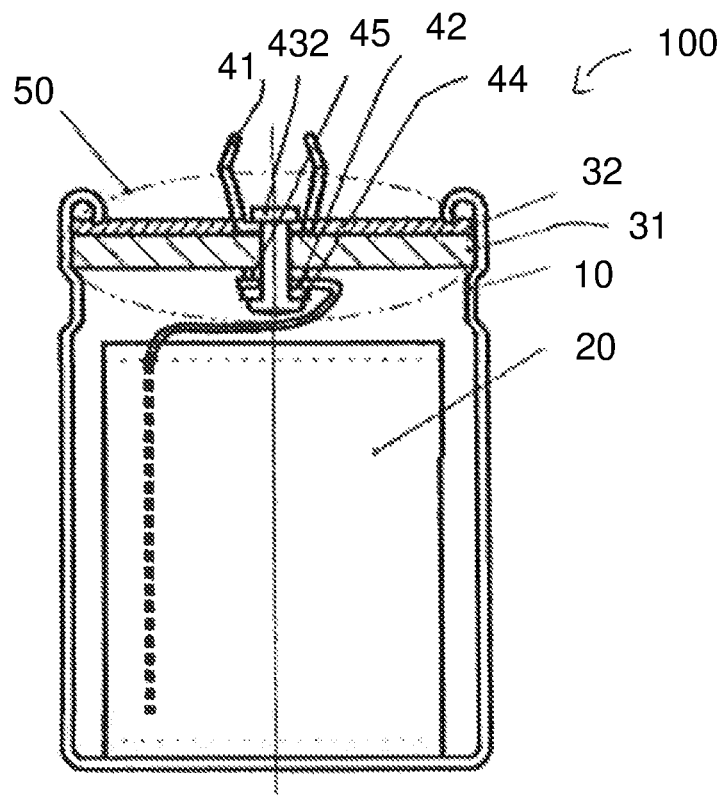
FIG. 1B shows a sectional view of the structure of an embodiment of an electrolytic capacitor from a second side.

FIG. 1A and FIG. 1B respectively show a sectional view of an embodiment of an electrolytic capacitor from different sides. The electrolytic capacitor 100 comprises a can 10, for example, an aluminium can, having an opening to insert a capacitor element 20. The capacitor element 20 is housed by the can 10. The capacitor element 20 comprises a winding which is impregnated with an electrolyte solution. A covering element 30 is arranged to close the opening of the can 10. The electrolytic capacitor further comprises a connection element 40 for externally applying an electrical signal to the capacitor element 20.

Figure 2A:
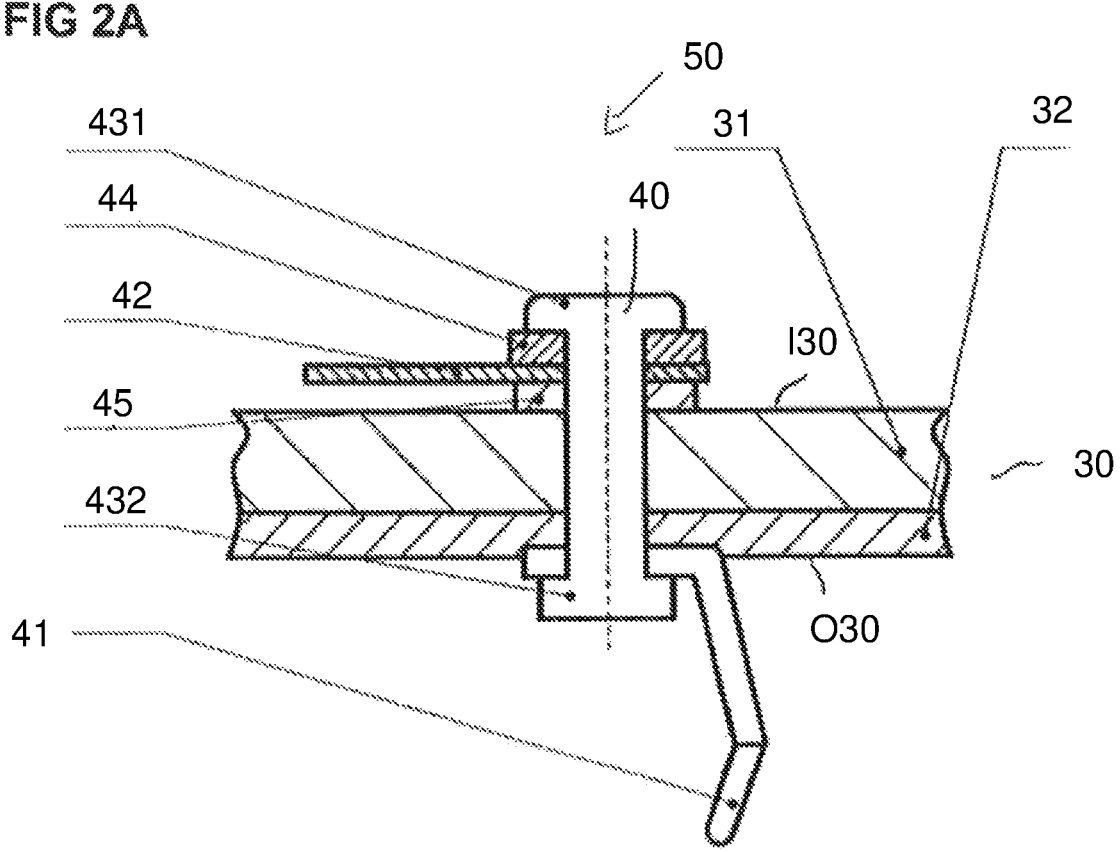
FIG. 2A shows a sectional view of an embodiment of a connection part of an electrolytic capacitor with a straight configuration of a lead tab.
Figure 2B:
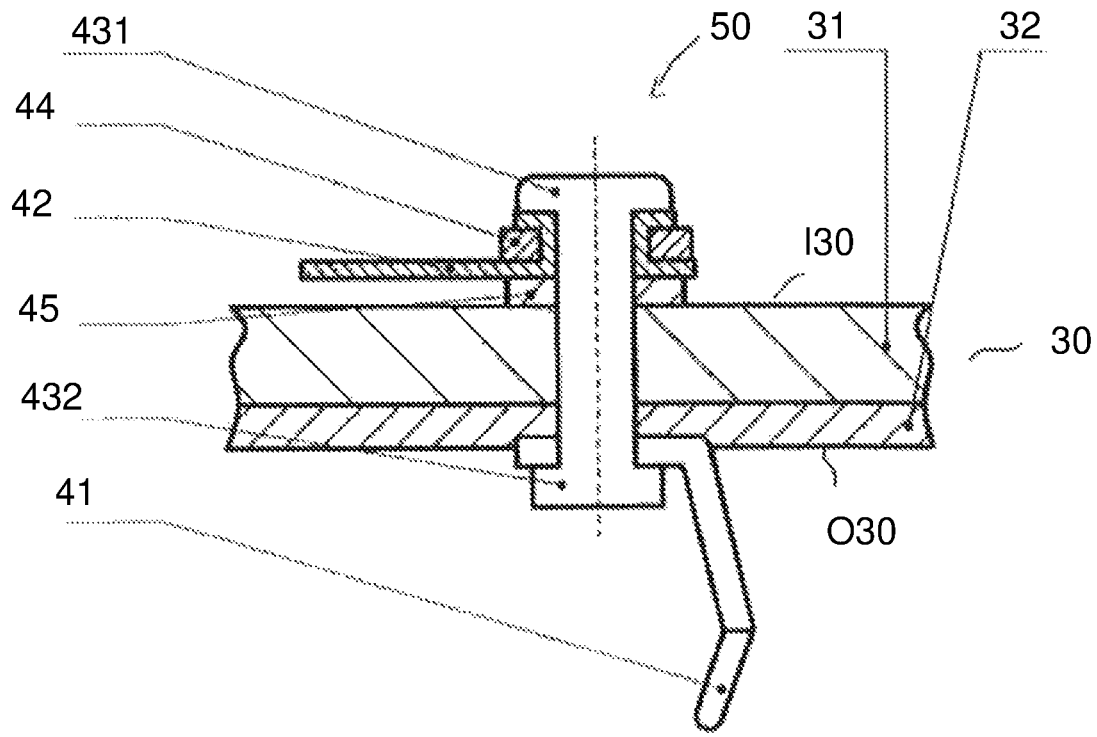
FIG. 2B shows a sectional view of an embodiment of a connection part of an electrolytic capacitor with a folded configuration of a lead tab.

FIGS. 2A and 2B respectively show an enlarged view of two different embodiments of a covering element 30 and a connection element 40. The covering element 30 and the connection element form the connection part of the electrolytic capacitor. The covering element 30 comprises a plate 31, for example made of Bakelite®, and a sealing rubber 32. The sealing rubber 32 is arranged on the plate 31. In the assembled configuration of the electrolytic capacitor, the plate 31 is directed to the inner area of the can 10. The covering element 30 has an inner surface I30 directed to the inside of the can 10 and an opposite outer surface O30 directed to the outside of the can 10.

The connection element 40 comprises an external terminal 41 for applying the electrical signal and a lead tab 42 being electrically coupled to the capacitor element 20 and to the external terminal 41. The connection element 40 comprises a rivet 43 having a first head 431 and a second head 432. The rivet 43 penetrates the covering element 40 so that the head 431 of the rivet protrudes out of the covering element 30 at the inner surface I30 of the covering element 30. The head 432 of the rivet 43 protrudes out of the covering element 30 at the outer surface O30 of the covering element 30. The rivet 43 is configured such that the head 431 of the rivet fixes the lead tab 42 to the covering element 30 at the inner surface I30 of the covering element 30, and the head 432 of the rivet fixes the external terminal 41 to the covering element 30 at the surface O30 of covering element 30.

The connection element 40 further comprises an upper washer 44 and a lower washer 45 respectively having an opening to receive the rivet 43. The upper washer 44 is placed between the lead tab 42 and the head 431 of the rivet 43. The upper washer 44 is used in the riveting process and it exists for fixing the lead tab 42 and keeping the good electrical contact in the life time of the capacitor. The lower washer 45 is placed between the lead tab 42 and the inner surface I30 of the covering element 30. The lower washer 45 is used to fix the rivet 43 and the external terminal 41 on the covering element 30.

According to the embodiment shown in FIG. 2A, the lead tab 42 is configured in a straight manner realizing a connection part without a so called tab-flowers. According to the embodiment shown in FIG. 2B, the lead tab 42 is configured in a folded manner realizing a connection part with a so called tab-flower.

Figure 2C:
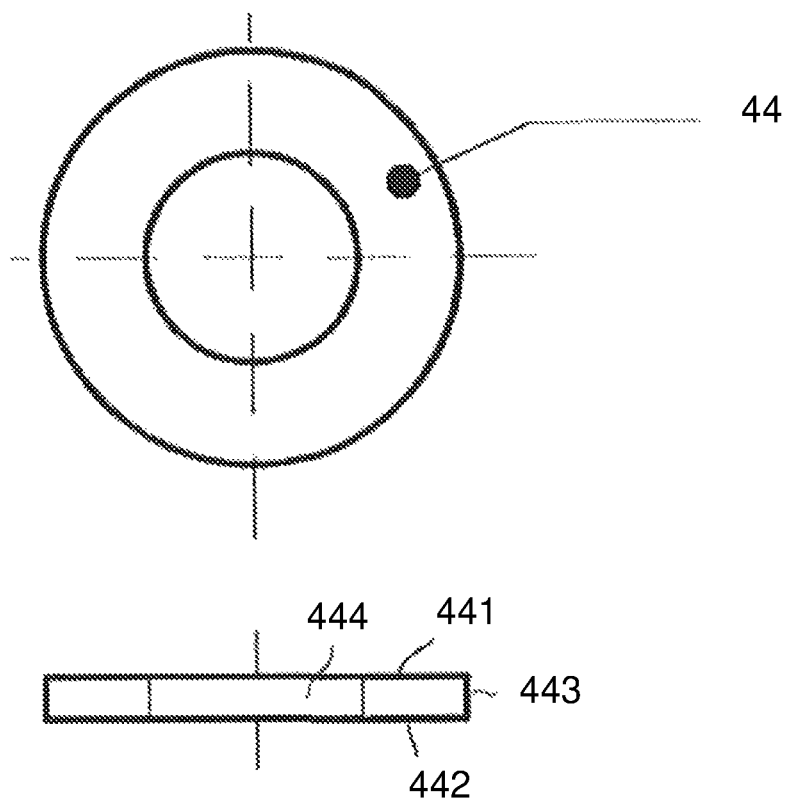
FIG. 2C shows an embodiment of an upper washer of a connection element of an electrolytic capacitor.

FIG. 2C shows a top and a lateral view to an embodiment of an upper washer 44. The upper washer 44 is formed having a first surface 441 directed to the inside of the can 10, a second surface 442 being located opposite to the first surface 441 and directed to the inner surface I30 of the covering element 30 and a third surface 443 laterally located between the first and the second surface of the upper washer 44. An opening 444 extends between the first surface 441 and the second surface 442.

Figure 2D:
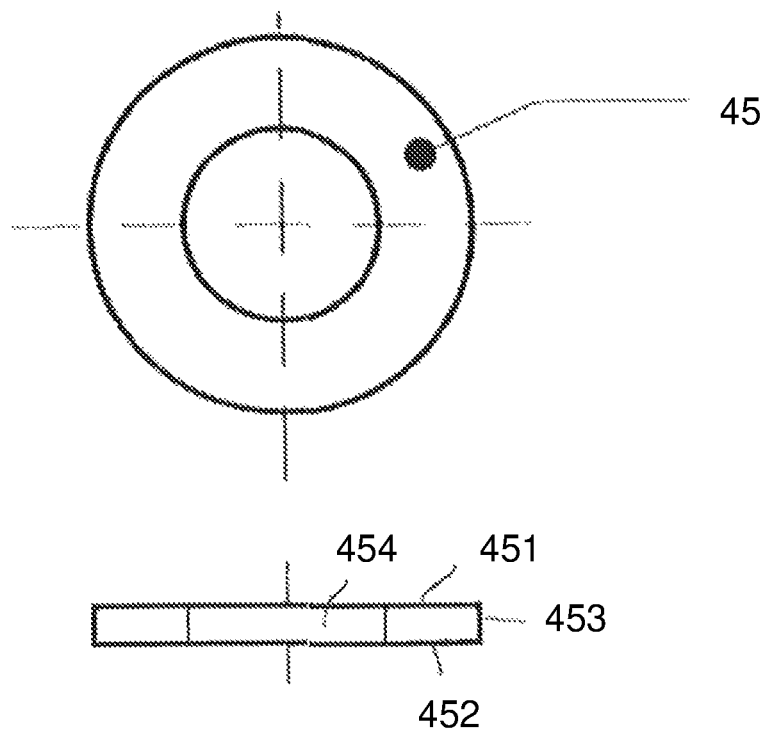
FIG. 2D shows an embodiment of a lower washer of a connection element of an electrolytic capacitor.

FIG. 2D shows a top and a lateral view of an embodiment of a lower washer 45. The lower washer 45 is formed having a first surface 451 directed to the inside of the can 10, a second surface 452 being located opposite to the first surface 451 and directed to the inner surface I30 of the covering element 30 and a third surface 453 laterally located between the first and the second surface of the upper washer 44. An opening 454 extends between the first surface 451 and the second surface 452.

When using the embodiment of the upper washer 44 as shown in FIG. 2C, residual electrolyte coming out from the capacitor element 20 may enter into the gaps among rivet 43, upper washer 44 and lead tab 42. As a consequence, an oxide membrane/layer will be generated on the surface of these parts in the gaps by electric current and may cause contact failure at the connection part.

Figure 3:
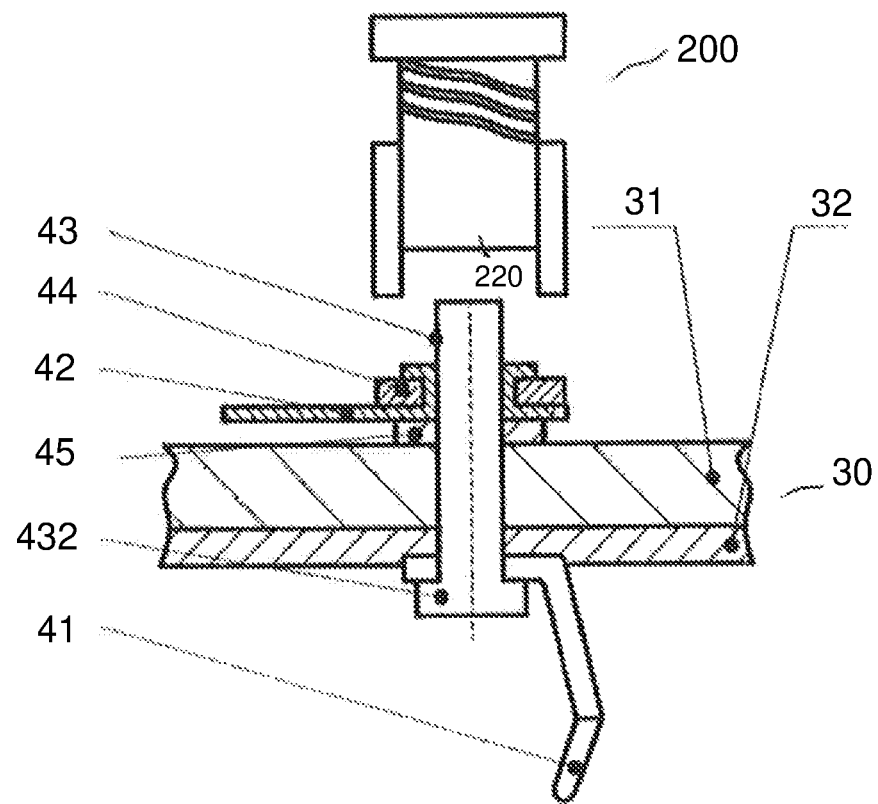
FIG. 3 shows a step of forming a head of a rivet of a connection element by a press machine.

FIG. 3 shows the use of a press machine 200 to crush the rivet 43 during the riveting process. The press machine 200 has a flat die/jig 220 for forming the first head 431 of the rivet 43.

Figure 4A:
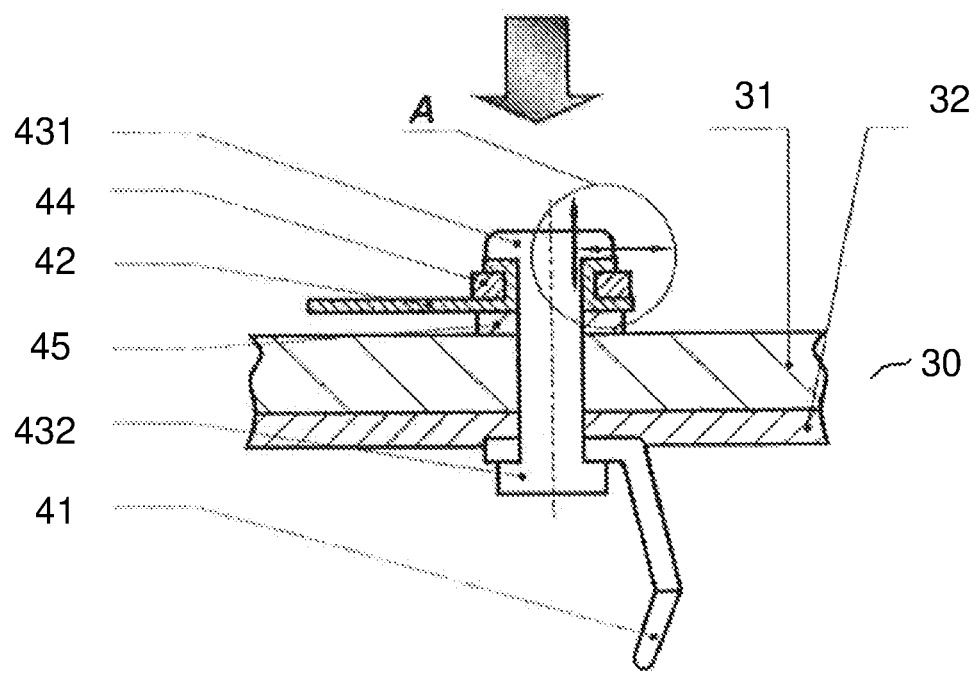
FIG. 4A shows the forming of a head of the rivet of a connection element of an electrolytic capacitor.
Figure 4B:
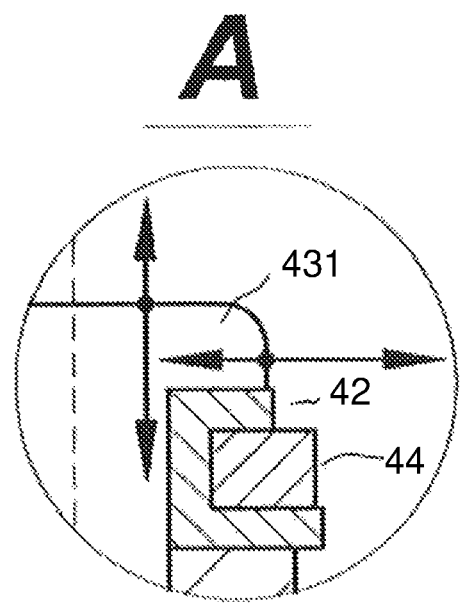
FIG. 4B shows an enlarged view of the forming of a head of a rivet of a connection element of an electrolytic capacitor during a riveting process.

FIG. 4A shows the forming of the head 431 of the rivet 43 during the riveting process. FIG. 4B shows an enlarged view of the head 431 of the rivet 43 as well as the lead tab 42 and the upper washer 44. As shown in FIGS. 4A and 4B, when the rivet 43 is crushed by the press machine 200, the rivet shaft is shortened and expanded in the transverse direction perpendicular to the rivet shaft. The stress given by the press machine 200 to the longitudinal direction is reduced due to the displacement of the head 431 of the rivet 43 to the transverse direction. As a consequence, the adhesive properties among rivet 43, lead tab 44 and upper washer 45 worsen so that the gaps between these elements are increased.

Figure 5:
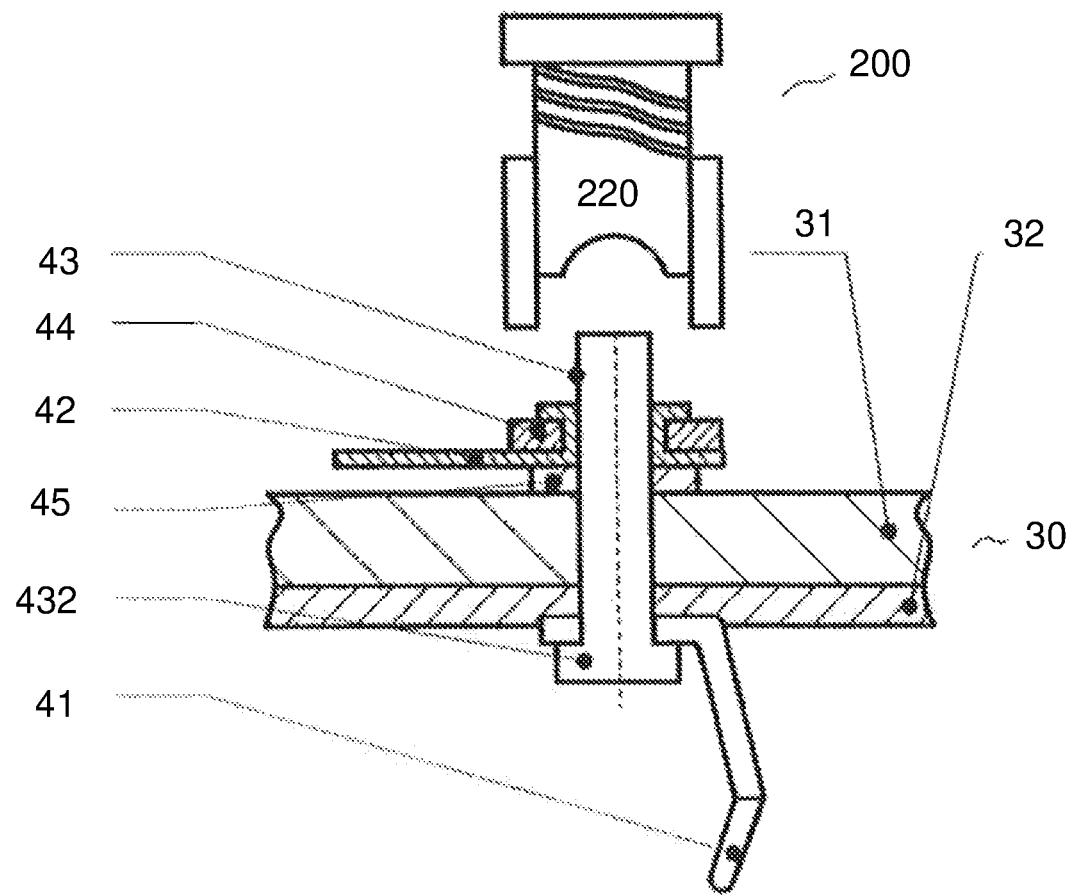
FIG. 5 shows the forming of a head of a rivet of a connection element of an electrolytic capacitor by a press machine.

In order to prevent the rivet shaft from expanding in the transverse direction out of the riveting die 220, an embodiment of a pressing machine, such as is shown in FIG. 5, may be used. The press machine comprises a riveting die 220 having a concave shape like a bowl to prevent the riveting shaft from expanding in the transverse direction. However, it was observed that the crushed shaft of the rivet may stick to the inside of the riveting die 220 and the productivity of the riveting process is reduced.

Figure 6:
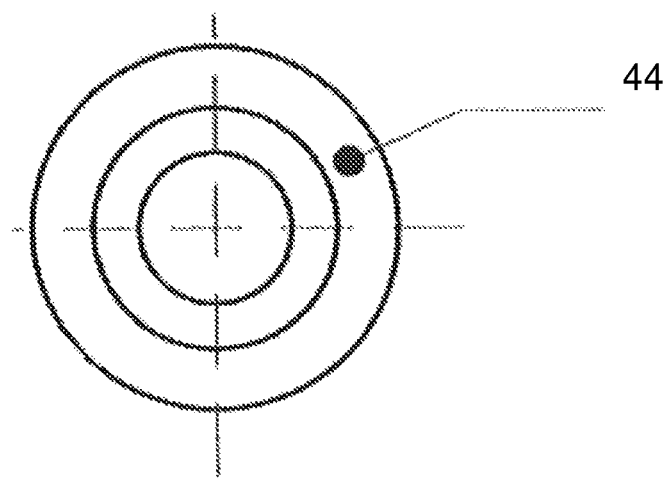
FIG. 6 shows a top view and a sectional view of an upper washer of a connection element of an electrolytic capacitor.
Figure 6:
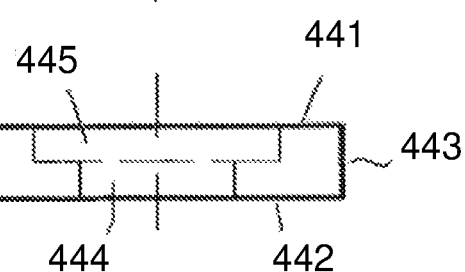

FIG. 6 shows another embodiment of the upper washer 44 in a top and a sectional view. The upper washer 44 has a first surface 441 directed to the inside of the can 10, a second surface 442 being located opposite to the first surface 441 and directed to the inner surface I30 of the covering element 30 and a third surface 443 laterally located between the first and the second surface of the upper washer 44. The upper washer 44 is configured such that the first surface 441 of the upper washer 44 comprises a cavity 445 to receive the head 431 of the rivet 43. The cavity may be configured as a concave-shaped cavity.

Figure 7:
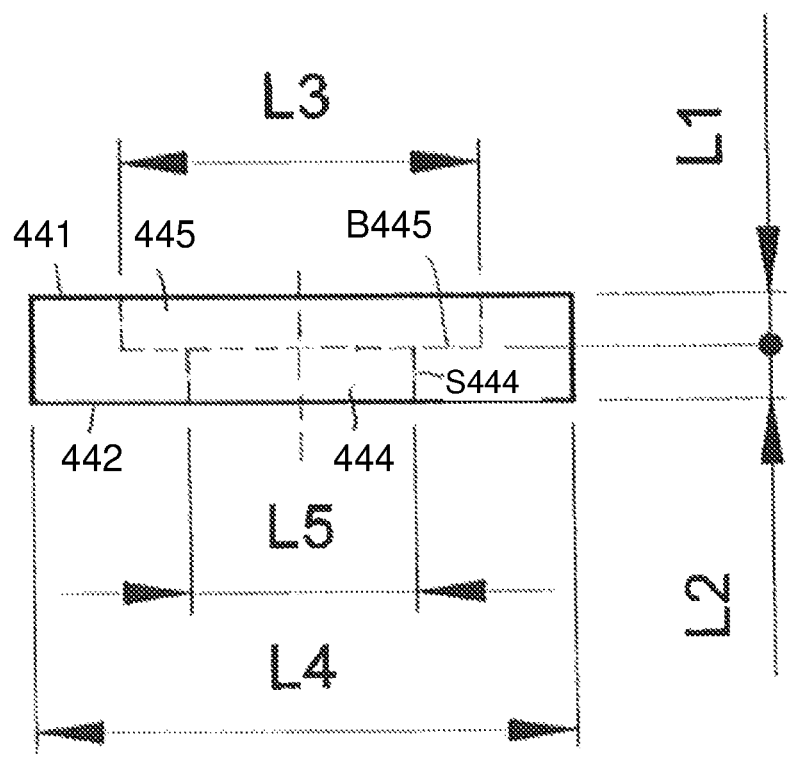
FIG. 7 shows an embodiment of an upper washer of a connection element of an electrolytic capacitor.

FIG. 7 shows an enlarged lateral view of the embodiment of the upper washer 44 illustrated in FIG. 6. The upper washer 44 comprises an opening 444 extending from the second surface 442 of the upper washer into the cavity 445 of the upper washer. The width L3 of the cavity 445 of the upper washer 44 is larger than the width L5 of the opening 444 of the upper washer. The cavity 445 of the upper washer 44 extends between the first surface 441 of the upper washer 44 and a bottom surface B445 of the cavity 445 in which the opening 444 of the upper washer 444 ends.

As illustrated in FIG. 7, a depth L1 of the cavity 445 of the upper washer 44 extends between the first surface 441 of the upper washer and the bottom surface B445 of the cavity 445. A depth L2 of the opening 444 of the upper washer 44 extends between the second surface 442 of the upper washer and the bottom surface B445 of the cavity 445. A quotient between the depths L1 and the depths L2 of the opening 444 is between 0.2 and 0.8, i.e. $0.2 \leq L1/L2 \leq 0.8$. A quotient between the width L3 and the width L4 is between 0.04 and 0.8, i.e. $0.04 \leq L3/L4 \leq 0.8$. The upper washer 44 which is strengthened by work hardening may be used into the connection element to avoid its own displacement.

Figure 8A:
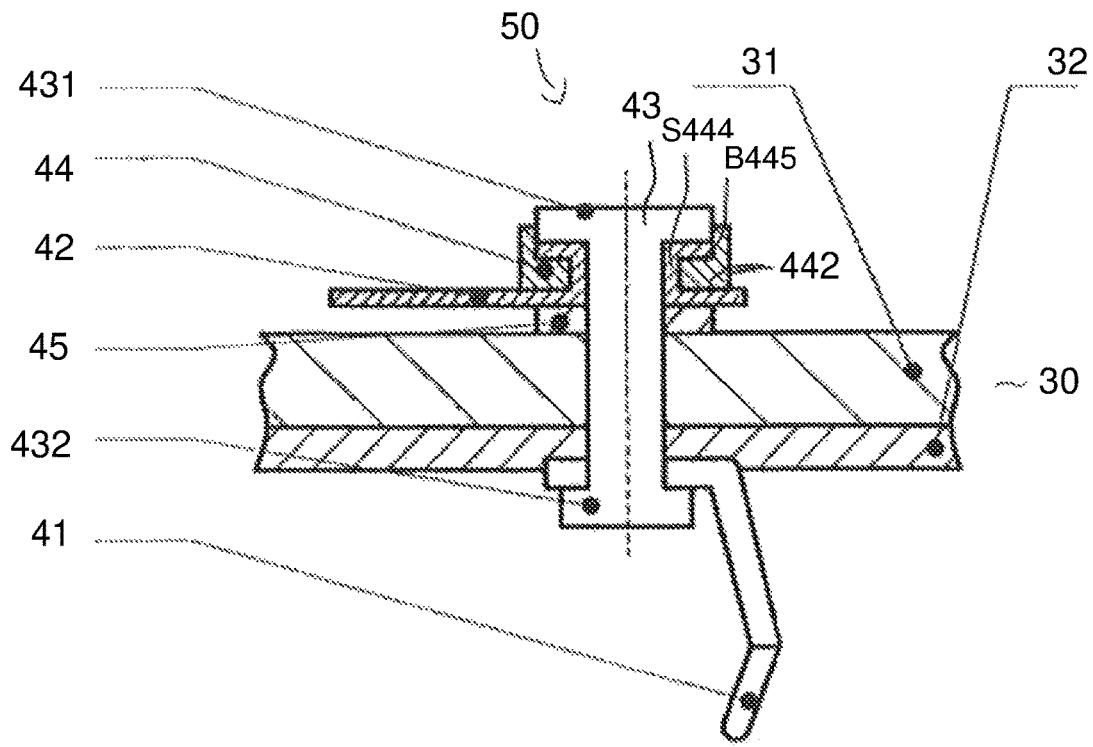
FIG. 8A shows an embodiment of a connection part of an electrolytic capacitor.
Figure 8B:
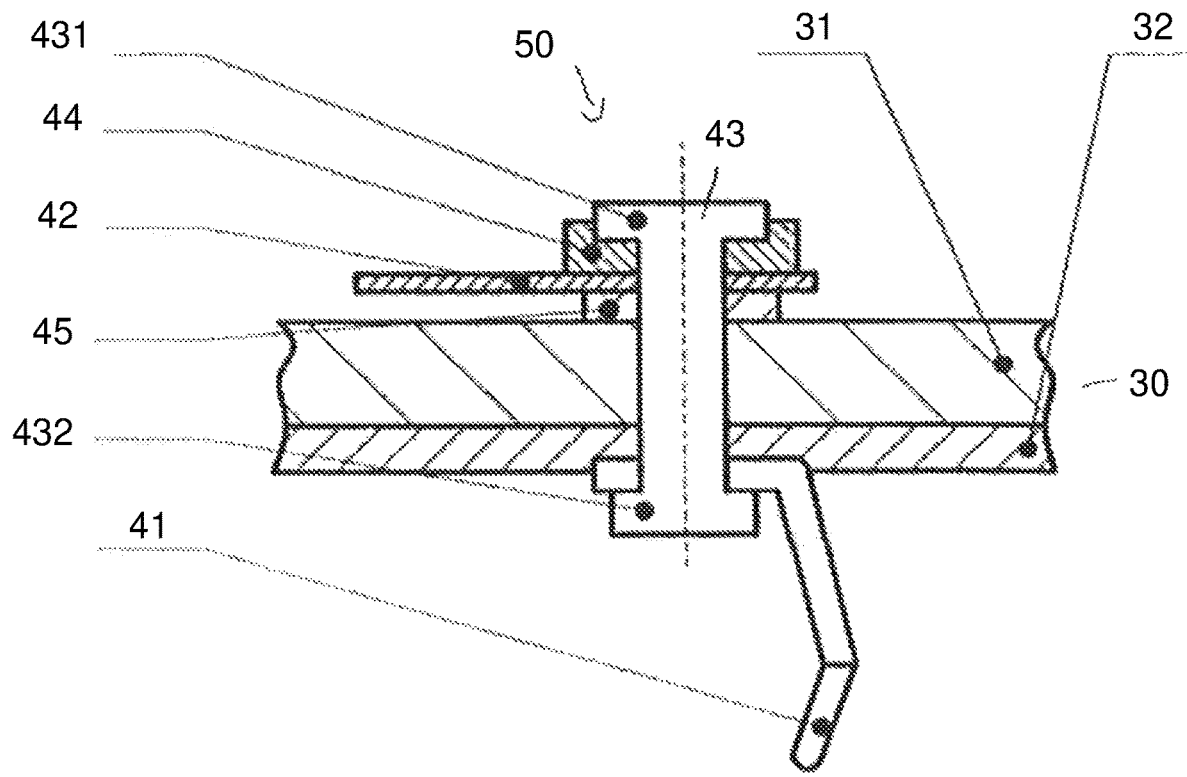
FIG. 8B shows another embodiment of a connection part of an electrolytic capacitor.

FIGS. 8A and 8B show lateral views of the connection part of the electrolytic capacitor comprising the covering element 30 and the connection element 40. FIG. 8A shows the embodiment with the folded lead tab 42, whereas FIG. 8B shows the embodiment with the straight lead tab 42. As shown in FIGS. 8A and 8B, the head 431 of the rivet 43 is placed within the cavity 445 of the upper washer 44. According to the embodiment of the folded lead tab 42, the lead tab 42 extends along the second surface 442 of the upper washer 44 and along a side wall S444 of the opening 444 of the upper washer and along the bottom surface B445 of the cavity 445 of the upper washer 44.

Figure 9A:
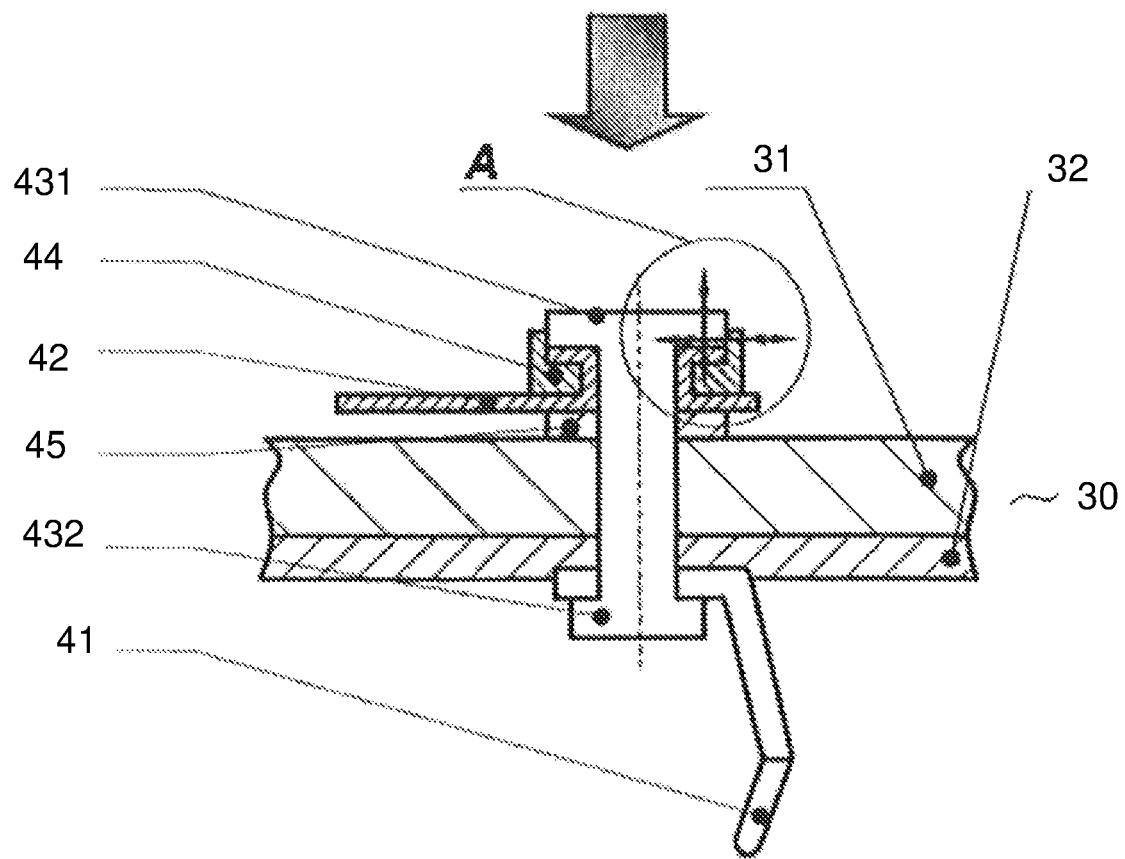
FIG. 9A shows the forming of the head of a rivet of a connection part of an electrolytic capacitor.
Figure 9B:
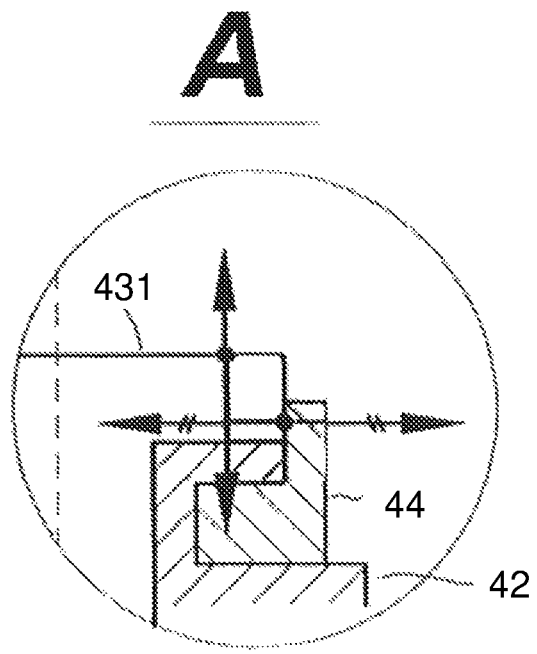
FIG. 9B shows an enlarged view of the forming of the head of a rivet of a connection part of an electrolytic capacitor.

According to the embodiment of the upper washer 44 and the connection part of the electrolytic capacitor shown in FIGS. 6 to 8B, the upper washer 44 comprises a cavity/concave shape 445 in the first surface 441 of the upper washer instead of a flat surface, such as is shown in FIG. 2C. As a consequence, when using the upper washer 44 with the cavity 445, as shown in FIG. 7, the crushed rivet shaft cannot be expanded to outside from the inner diameter of the washer and the stress is efficiently applied to the longitudinal direction, as shown in FIGS. 9A and 9B. Consequently, the adhesive properties among rivet 43, lead tab 42 and upper washer 44 can be improved. Furthermore, the crushed shaft of the rivet 43 does not stick to the riveting die of the press machine 200.

Figure 10A:
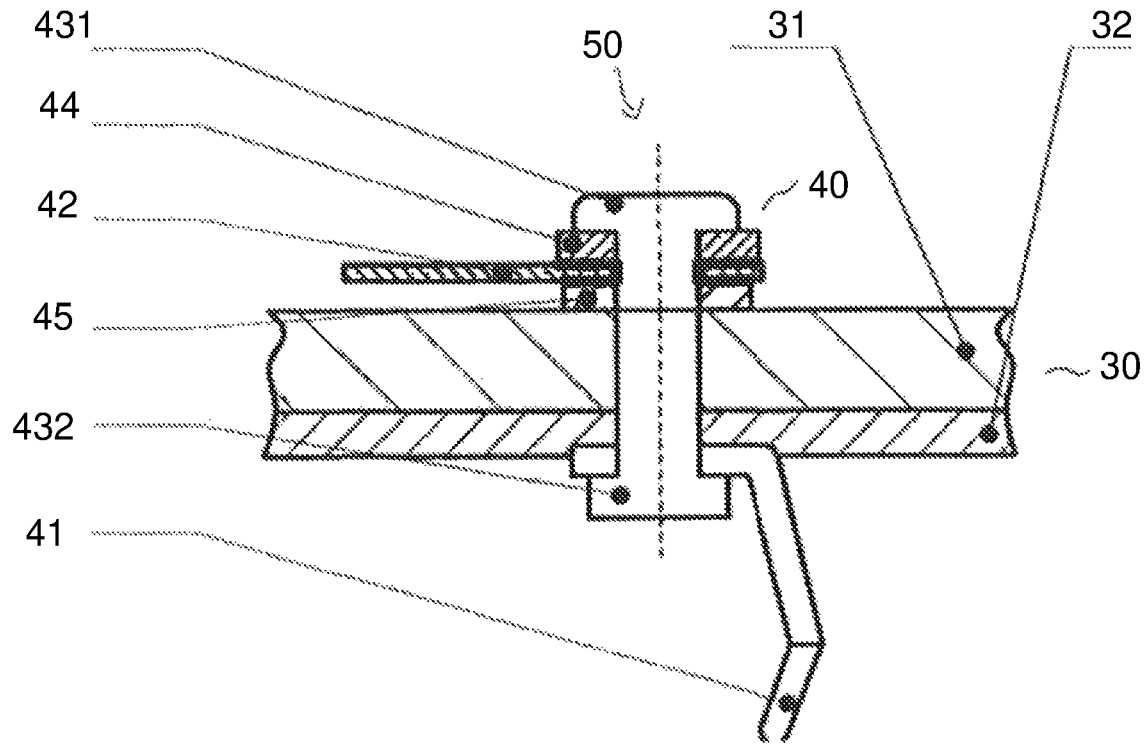
FIG. 10A shows a lateral view of a connection part of an electrolytic capacitor with a straight configuration of a lead tab.

FIG. 10A shows a lateral view of an embodiment of a connection part of an electrolytic capacitor with a straight configuration of the lead tab 42. The upper washer 44 and the lower washer 45 are configured as shown in FIGS. 2C and 2D. An effective contact area between the lead tab 42 and the rivet 43 and the upper and lower washer 44, 45 is shown in FIG. 10A with bold lines. Although the connection element 40 comprising the rivet 43, the upper washer 44, the lower washer 45 and the lead tab 42 occupies a large volume in the capacitor design, the effective contact area between the rivet 43 and the lead tab 42 is very small and may be too small to keep contact for a long life.

Figure 10B:
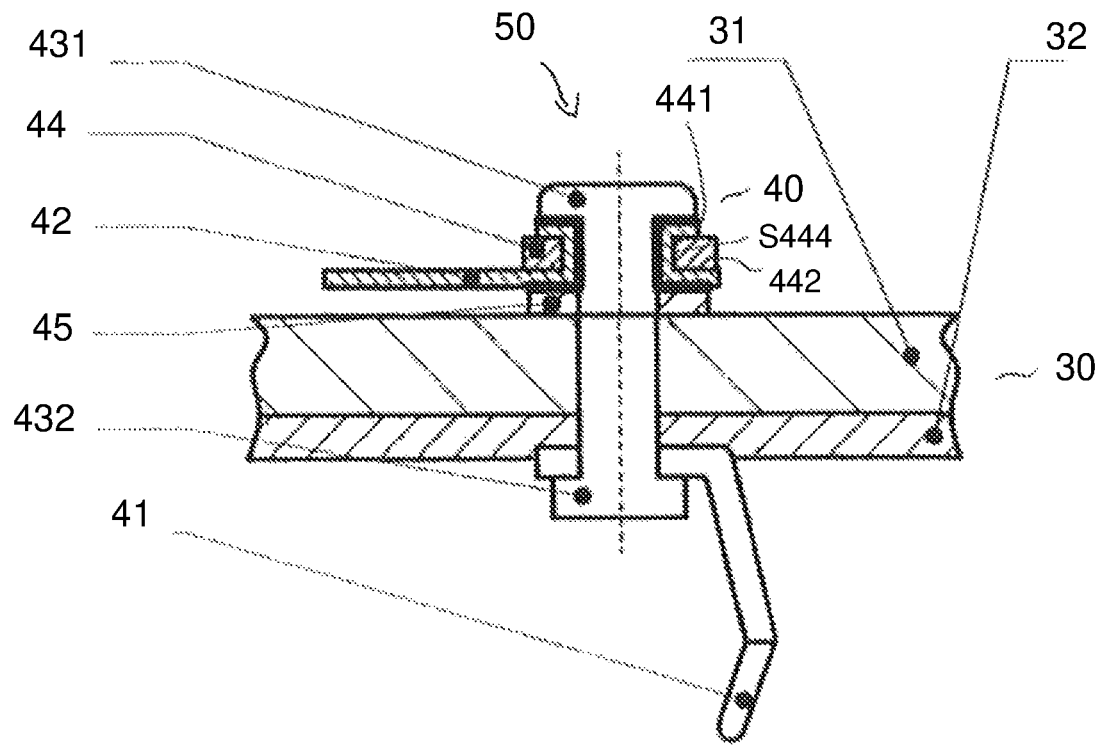
FIG. 10B shows a lateral view of an embodiment of a connection part of an electrolytic capacitor with a folded configuration of a lead tab.

FIG. 10B shows a lateral view of an embodiment of a connection part of an electrolytic capacitor comprising a connection element 40 including a lead tab 42 being embodied in a folded configuration. The lead tab 42 extends along the second surface 442 of the upper washer 44 and along a sidewall S444 of the opening of the upper washer 44 and along the first surface 441 of the upper washer 44 being configured as shown in FIG. 2C. The folded lead tab (tab-flower) made by a tab-flower riveting process allows to increase the contact area as shown in FIG. 10B by the bold lines. However, the number of tab-flowers and the area of individual tab-flowers were limited and the obtained contact area is usually not sufficient to keep good contact for a long life. Consequently, contact failures can be observed when providing the electrolytic capacitor with a connection part as shown in FIGS. 10A and 10B.

Figure 11A:
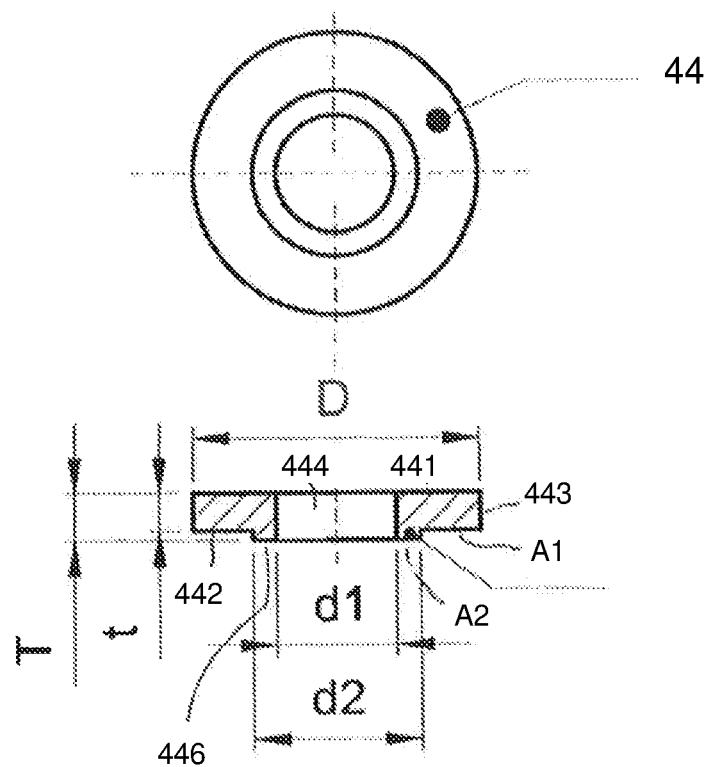
FIG. 11A shows an embodiment of an upper washer of a connection part of an electrolytic capacitor.
Figure 11B:
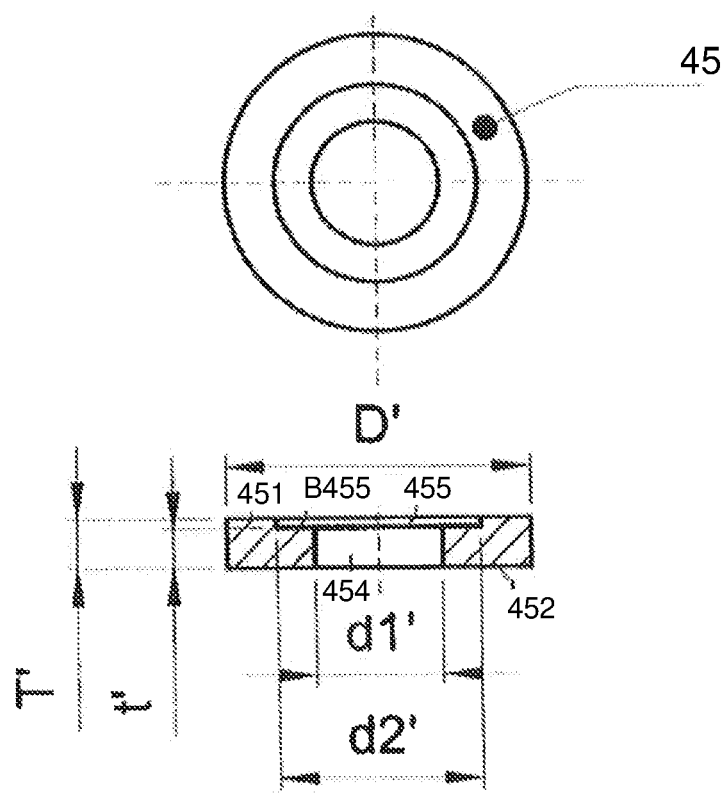
FIG. 11B shows an embodiment of a lower washer of a connection part of an electrolytic capacitor.

FIG. 11A shows a top and a lateral view of an embodiment of the upper washer 44 to improve the effective contact area between the lead tab 42 and the rivet 43 in combination with a lower washer 45 being configured as shown in FIG. 11B.

According to the embodiment of the upper washer 44 shown in FIG. 11A, the upper washer 44 is formed having a first surface 441 directed to the inside of the can 10, a second surface 442 being located opposite to the first surface 441 and directed to the inner surface I30 of the covering element 30 and a third surface 443 laterally located between the first and the second surface 441, 442 of the upper washer 44. The upper washer 44 is configured such that the second surface 442 of the upper washer 44 comprises a protrusion 446.

The second surface 442 of the upper washer 44 has a first area A1 and a second area A2. The second area A2 forms the protrusion 446 by protruding from the first area A1 of the second surface 442 of the upper washer 44. The opening 444 of the upper washer 44 extends from the first surface 441 of the upper washer to the second area A2 of the second surface 442 of the upper washer. The upper washer 44 has a first height t between the first surface 441 of the upper washer and the first area A1 of the second surface 442 of the upper washer. The upper washer 44 has a second height T between the first surface 441 of the upper washer and the second area A2 of the second surface 442 of the upper washer 44. A quotient between the first height t and the second height T of the upper washer 44 is between 0.2 and 0.8.

FIG. 11B shows a top view and a lateral view of an embodiment of the lower washer 45 having a first surface 451 directed to the upper washer 44 and an opposite second surface 452 directed to the covering element 30. An opening 454 of the lower washer 54 extends from the second surface 452 of the lower washer 45 to a bottom surface B455 of a cavity 455 of the lower washer. The cavity 455 of the lower washer 45 extends from the first surface 451 of the lower washer to the bottom surface B455 of the cavity of the lower washer. The cavity 455 of the lower washer is complementarily shaped in relation to the protrusion 446 of the upper washer 44. The lower washer 45 has a first height t' between the bottom surface B455 of the cavity 455 and the second surface 452 of the lower washer 45. The lower washer 45 has a second height T' between the first surface 451 of the lower washer 45 and the second surface 452 of the lower washer. A quotient between the first height t' and the second height T' of the lower washer 45 is between 0.2 and 0.8.

Figure 12A:
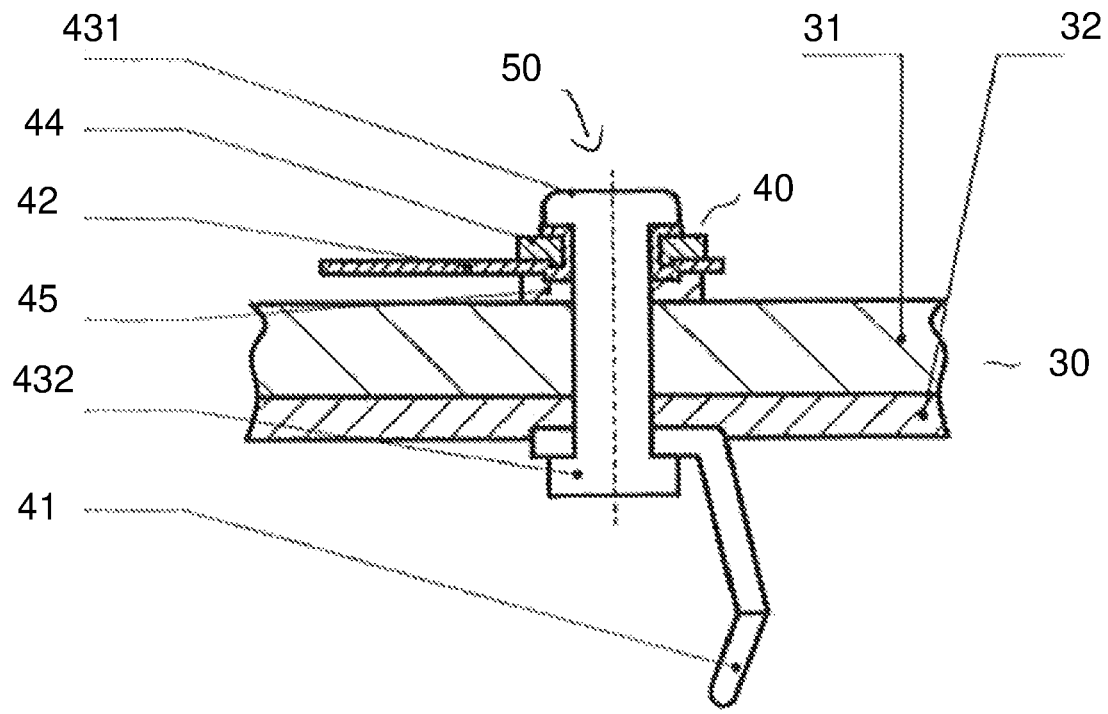
FIG. 12A shows a lateral view of an embodiment of a connection part of an electrolytic capacitor with folded configuration of a lead tab.
Figure 12B:
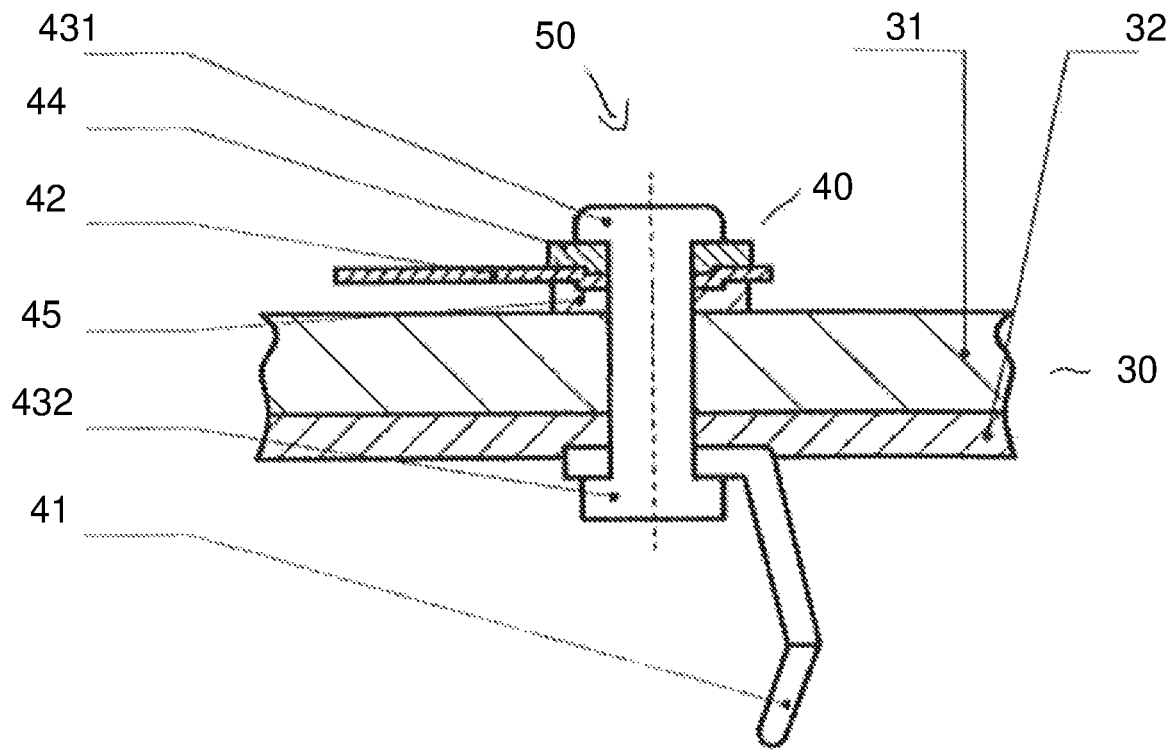
FIG. 12B shows a lateral view of an embodiment of a connection part of an electrolytic capacitor with a straight configuration of a lead tab.

FIG. 12A shows an embodiment of a connection part of the electrolytic capacitor comprising the covering element 30 and the connection element 40 with the upper washer 44 embodied as shown in FIG. 11A and with the lower washer 45 embodied as shown in FIG. 11B, wherein the lead tab 42 is embodied in a folded configuration. FIG. 12B shows the embodiment of the connection part of the electrolytic capacitor comprising the upper washer 44 embodied as shown in FIG. 11A and the lower washer 45 embodied as shown in FIG. 11B in an assembled manner, wherein the lead tab 42 is embodied in a straight manner. According to both of the embodiments, the upper washer 44 and the lower washer 45 are configured such that the lead tab 42 is pressed in the cavity 455 of the lower washer 45 by the protrusion 446 of the upper washer 44.

As shown in FIGS. 12A and 12B, the contact failure is resolved by increasing the effective contact area among lead tab 42 and upper washer 44 and lower washer 45. The upper washer 44 comprises a convex shape instead of a flat second surface 442 as shown in FIG. 2C. The first surface 451 of the lower washer 45 has a cavity/concave shape instead of the flat first surface 451 of the lower washer shown in FIG. 2D. The extended part/protrusion 446 of the upper washer 44 presses the lead tab 42 to the underside after the rivet shaft is crushed. Consequently, the effective contact area among lead tab 42 and upper washer 44 and lower washer 45 is increased due to the extended part of the upper washer 44. In addition, since the stress of the extended part in a narrow area becomes larger, the extended part/protrusion 446 can keep good contact between lead tab 42 and lower washer 45.

Figure 13A:
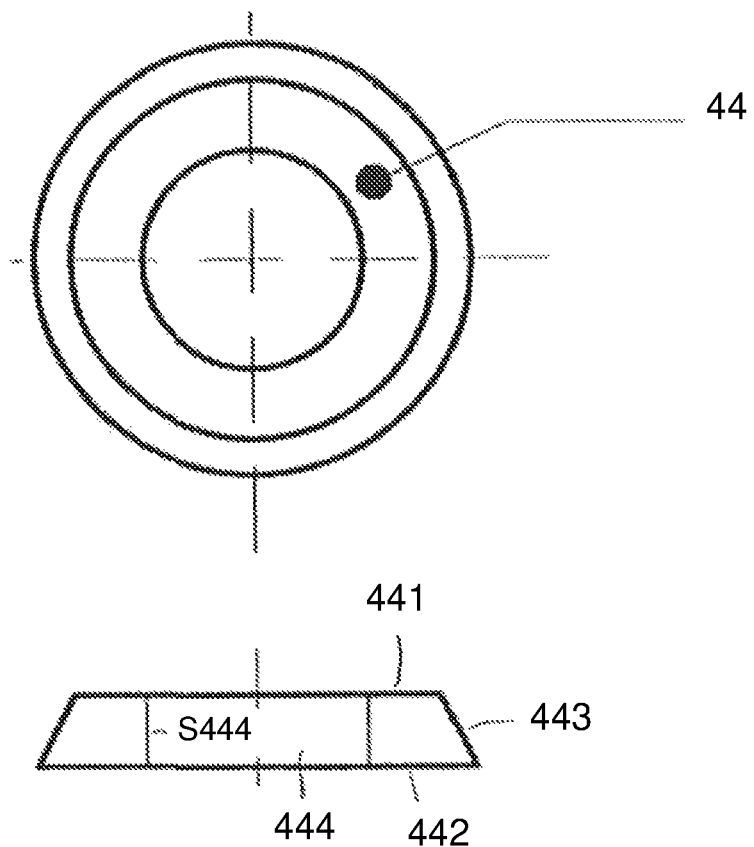
FIG. 13A shows an embodiment of an upper washer of a connection element with a tapered lateral surface.

FIG. 13A shows another embodiment of the upper washer 45 to improve the adhesive properties among lead tab 42, rivet 43 and upper washer 44 to avoid contact failures by the generation of an oxide layer on the surface of these parts. The upper washer 44 is formed having a first surface 441 directed to the inside of the can 10, a second surface 442 being located opposite to the first surface 441 and directed to the inner surface I30 of the covering element 30 and a third surface 443 laterally located between the first and the second surface of the upper washer 44. The upper washer 44 is configured such that the third surface 443 of the upper washer is formed with a taper so that the second surface 442 of the upper washer has a larger area than the first surface 441 of the upper washer 44. The opening 444 of the upper washer 44 extends from the first surface 441 of the upper washer to the second surface 442 of the upper washer.

Figure 13B:
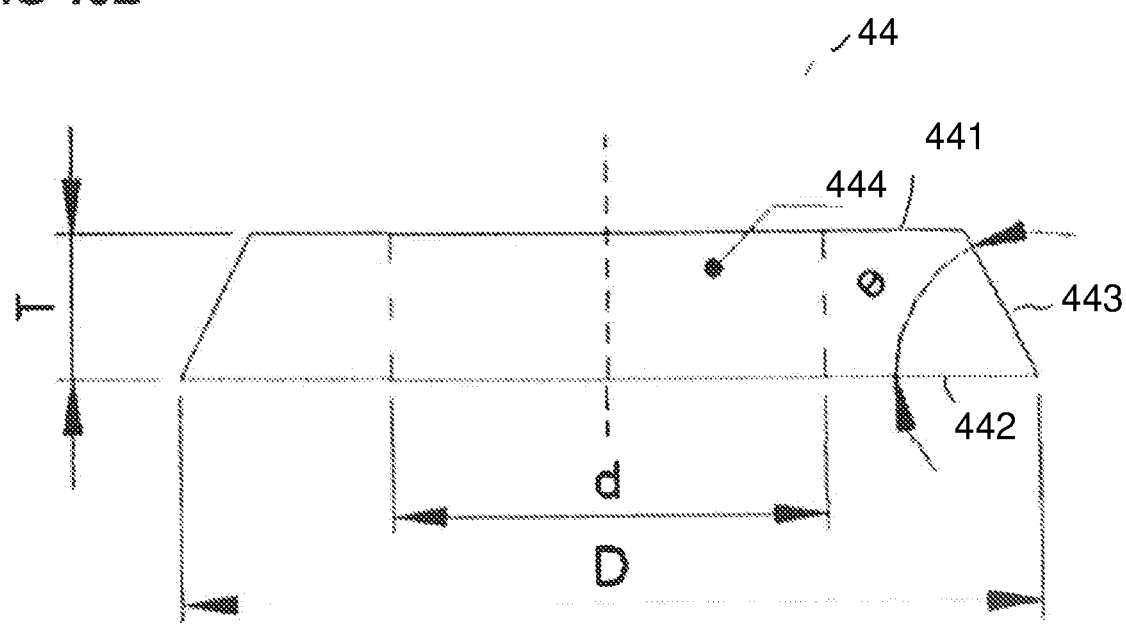
FIG. 13B shows the geometry of the embodiment of the upper washer of a connection element with a tapered lateral surface.

FIG. 13B shows the geometry of the upper washer 44. An angle θ between the second surface 442 of the upper washer 44 and the tapered third surface 443 of the upper washer is between 20° and 80°. The diameter D of the upper washer 44 along the second surface 442 is between 3 mm and 10 mm. The diameter d of the opening 444 of the upper washer 44 is between 2 mm and 8 mm. The thickness T of the upper washer 44 between the first and second surface 441, 442 of the upper washer is between 0.3 mm and 5 mm.

Figure 14A:
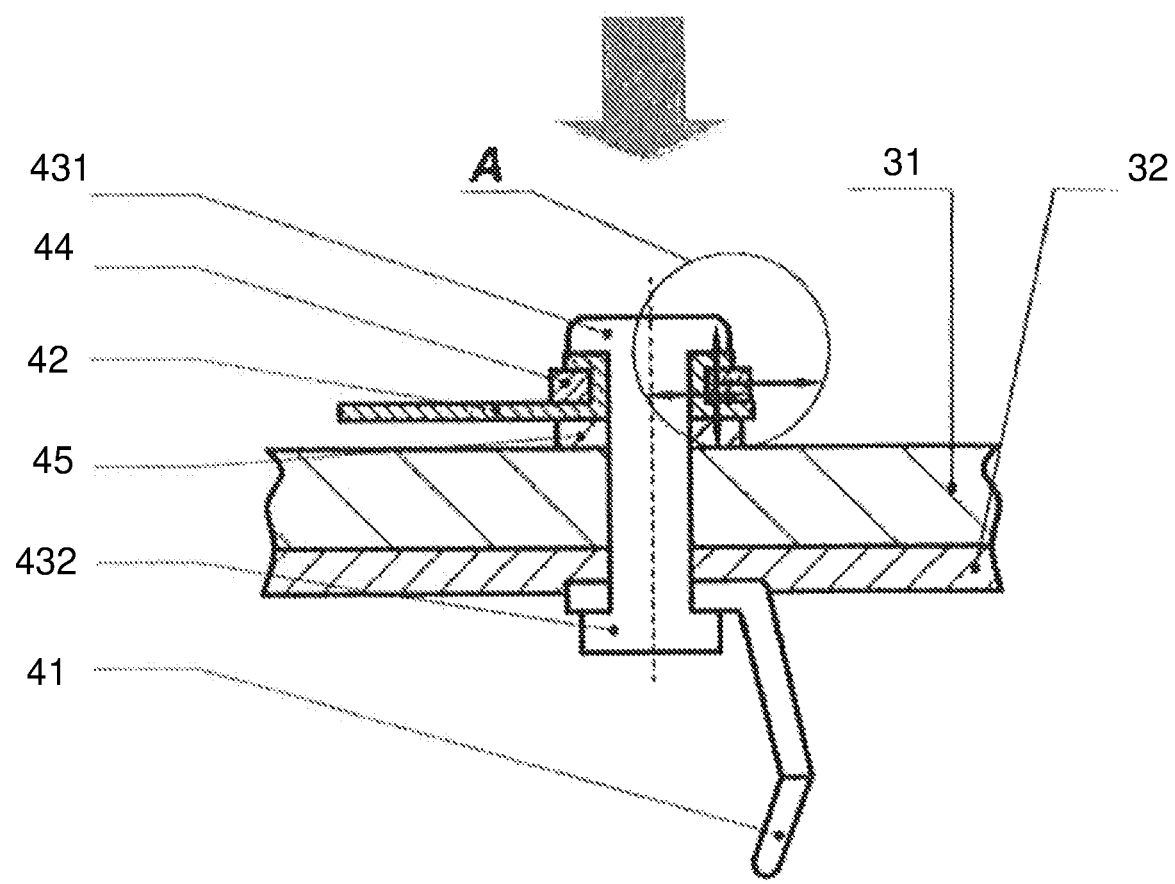
FIGS. 14A and 14B show the deformation of the upper washer during a riveting process using a standard press machine.
Figure 14B:
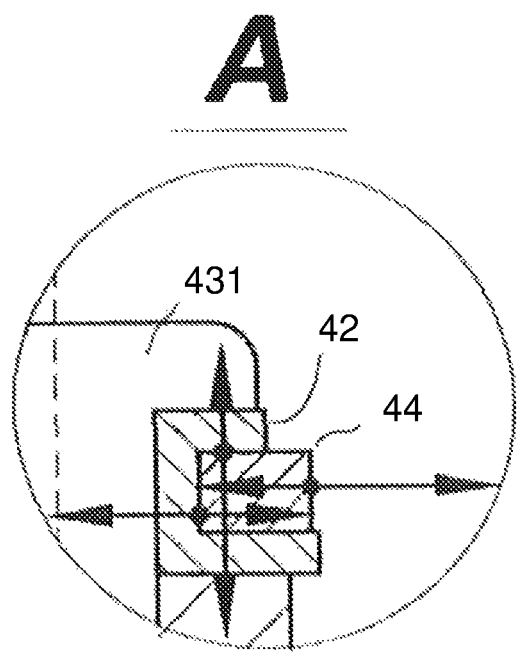

When an embodiment of an upper washer 44 as shown in FIG. 2C is used for the connection element 40 and the rivet 43 is crushed by the press machine, the thickness of upper washer 44 is shortened and the outer side surface of the upper washer 44 is expanded. The inner side surface of the washer 44 is shrunk. FIGS. 14A and 14B show the expansion and shrinkage of areas of the upper washer 44 during the riveting process, when an embodiment of an upper washer as shown in FIG. 2C is used. However, when the outer side surface of the upper washer 44 is expanded, the inner side surface of the upper washer could not be shrunk well and the adhesive properties among lead tab 42, rivet 43 and upper washer 44 in the case of tab-flower riveting or the adhesive properties among rivet 43 and upper washer 44 in case of no tab-flower riveting worsen and the gaps there between are increased.

Figure 15A:
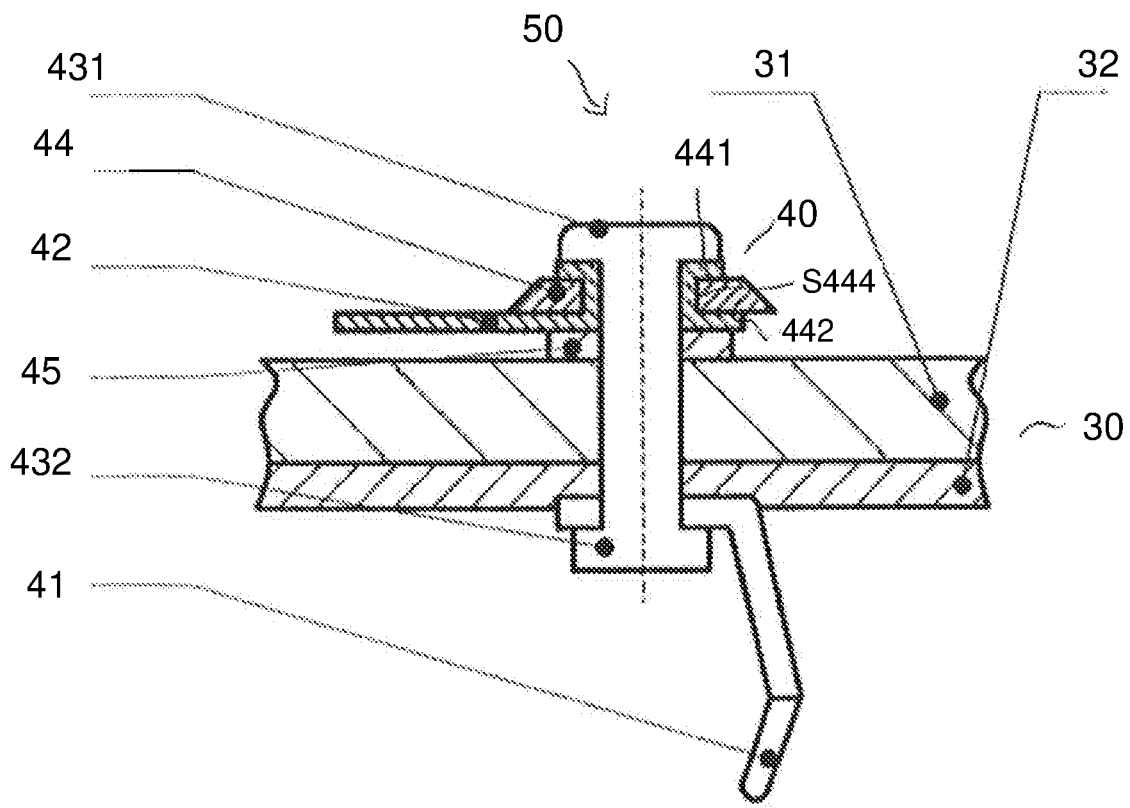
FIG. 15A shows an embodiment of an assembled connection part of an electrolytic capacitor with an upper washer with a tapered lateral surface and a folded lead tab.
Figure 15B:
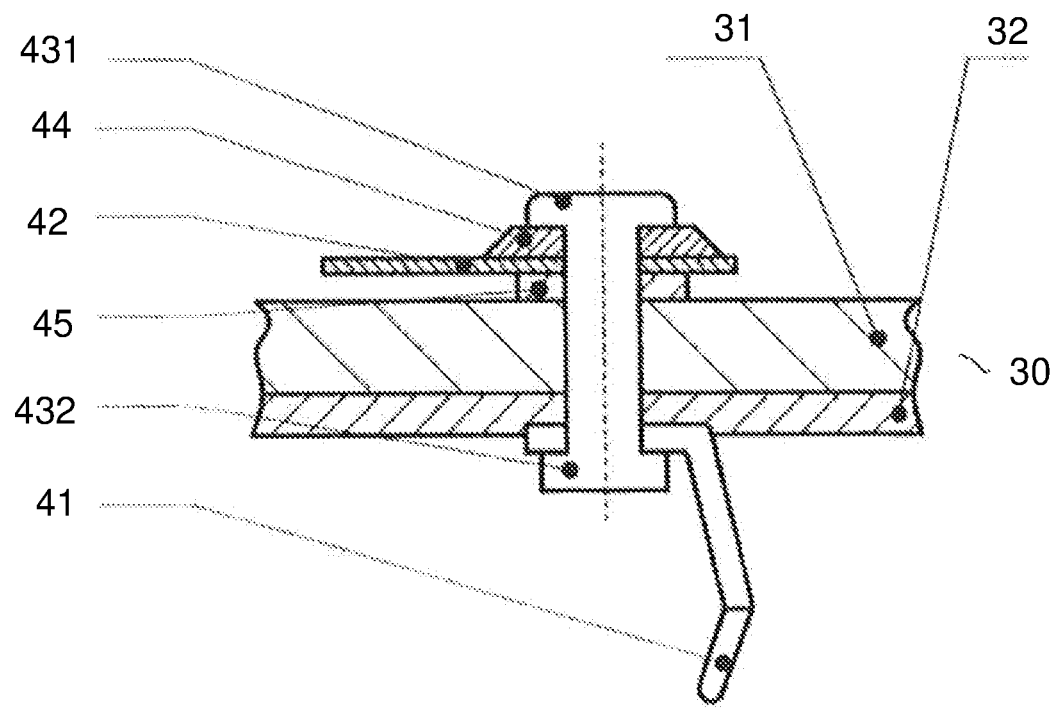
FIG. 15B shows an embodiment of a connection part of an electrolytic capacitor with an upper washer with a tapered lateral surface and a straight lead tab in an assembled configuration.

FIG. 15A shows the connection part comprising the covering element 30 and the connection element 40 comprising the upper washer 44 with the tapered third surface 443 in an assembled configuration, wherein the lead tab 42 is configured in a folded configuration. In the folded configuration, the lead tab 42 extends along the second surface 442 of the upper washer 44 and along a sidewall S444 of the opening 444 of the upper washer and along the first surface 441 of the upper washer. FIG. 15B shows the connection part comprising the covering element 30 and the connection element 40 including the upper washer 44 with the tapered third surface 443, wherein the lead tab 42 is configured in a straight manner.

Figure 16A:
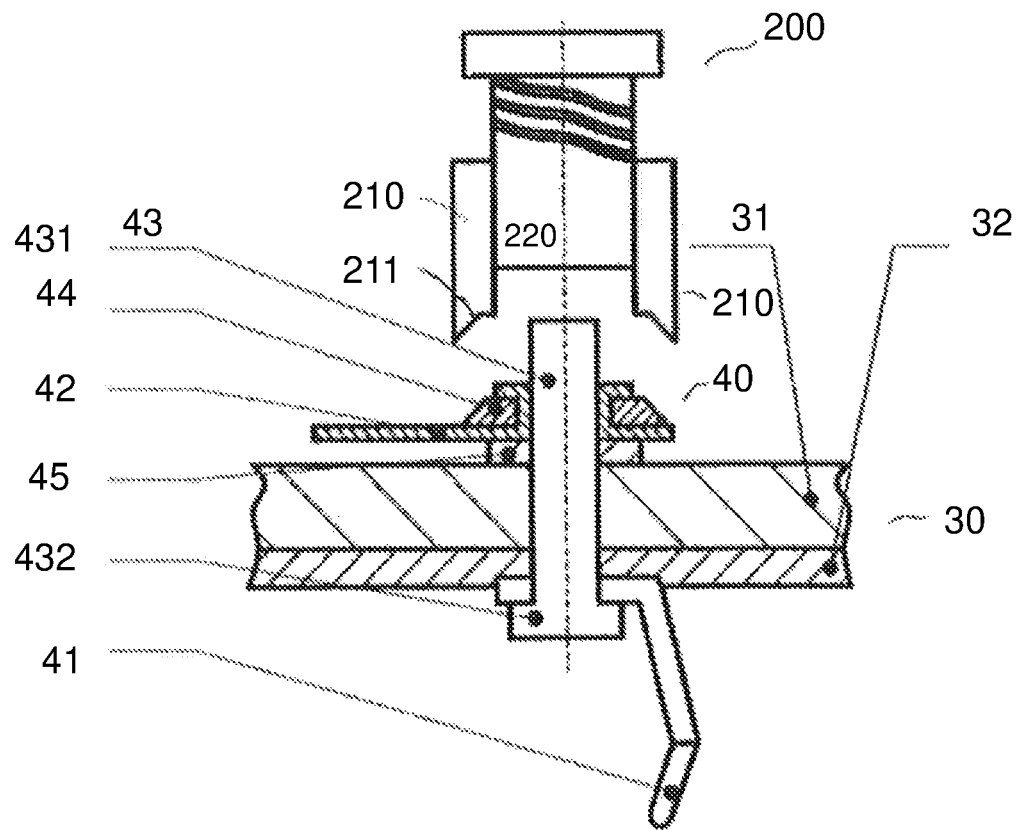
FIGS. 16A and 16B show a first embodiment of a press machine.
Figure 16B:
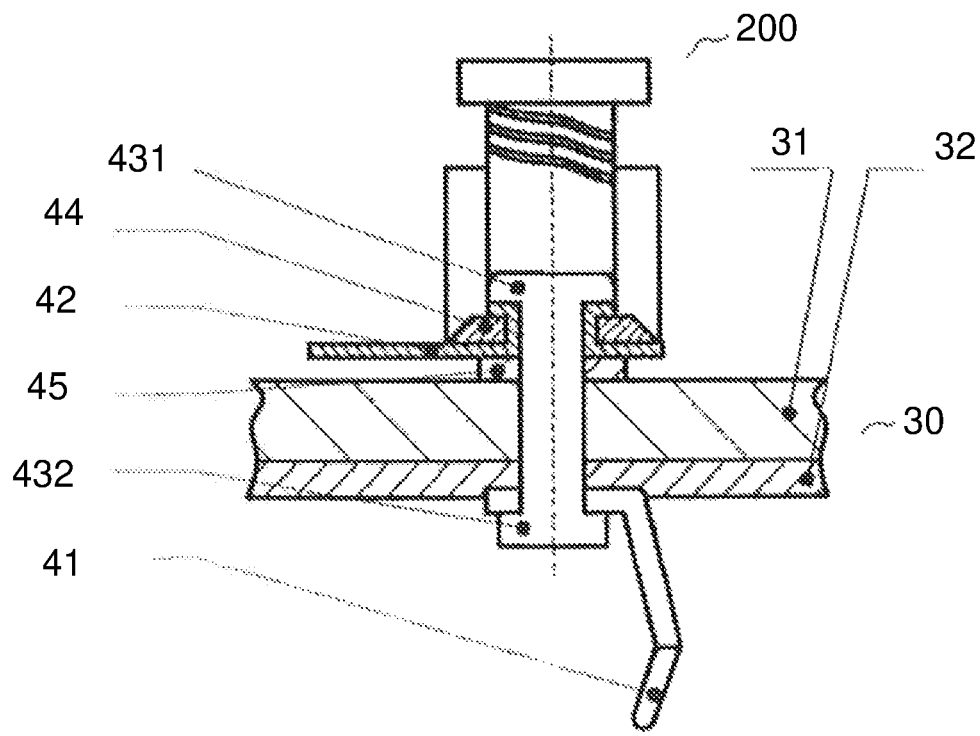
Figure 16C:
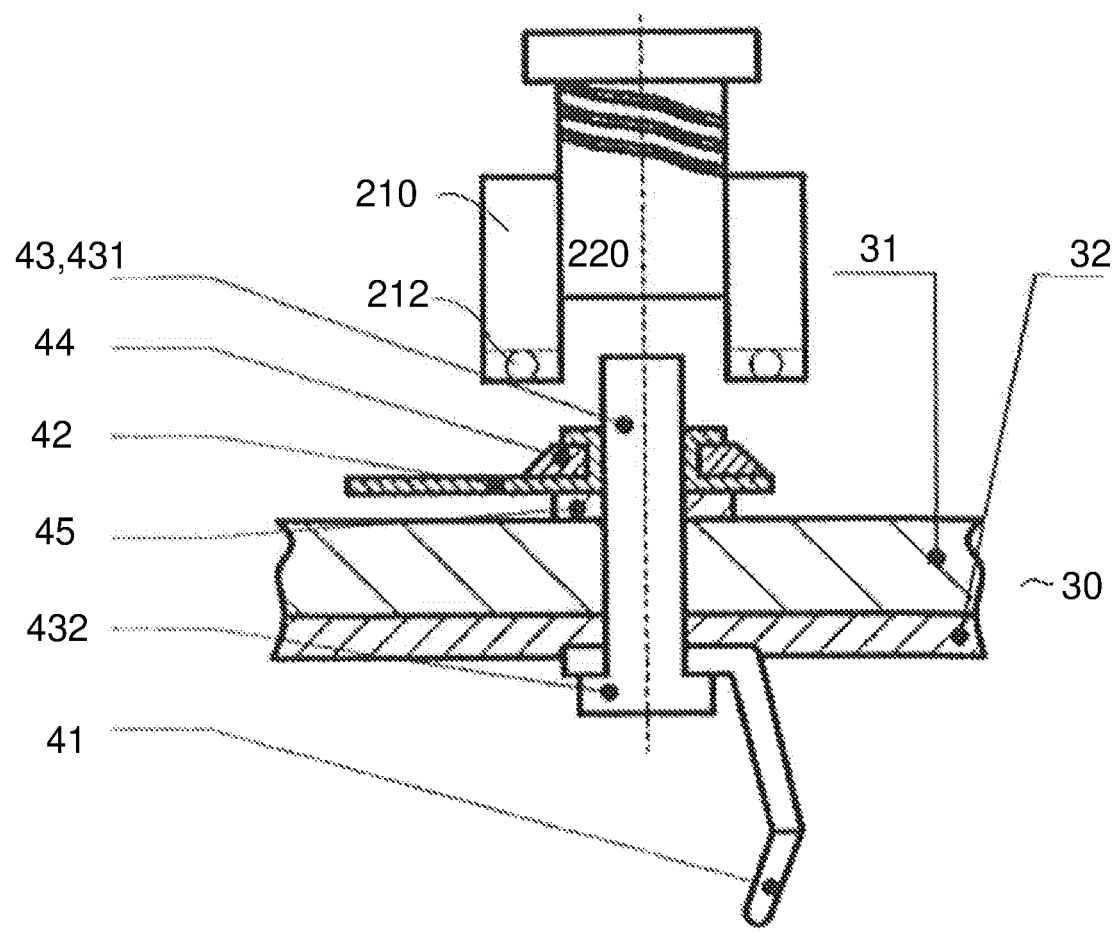
FIG. 16C shows a second embodiment of a press machine.

When using a standard press machine, such as is shown in FIG. 3 or FIG. 5, the outer jig 210 of the press machine fixes the upper washer at the first, then the inner jig/riveting die 220 crushes the rivet. When the upper washer of the embodiment as shown in FIGS. 13A and 13B with the tapered third surface 443 is used, a special press machine 200 is used. FIGS. 16A and 16B show a first embodiment of a press machine, and FIG. 16C shows a second embodiment of a press machine to perform the riveting process.

Figure 17A:
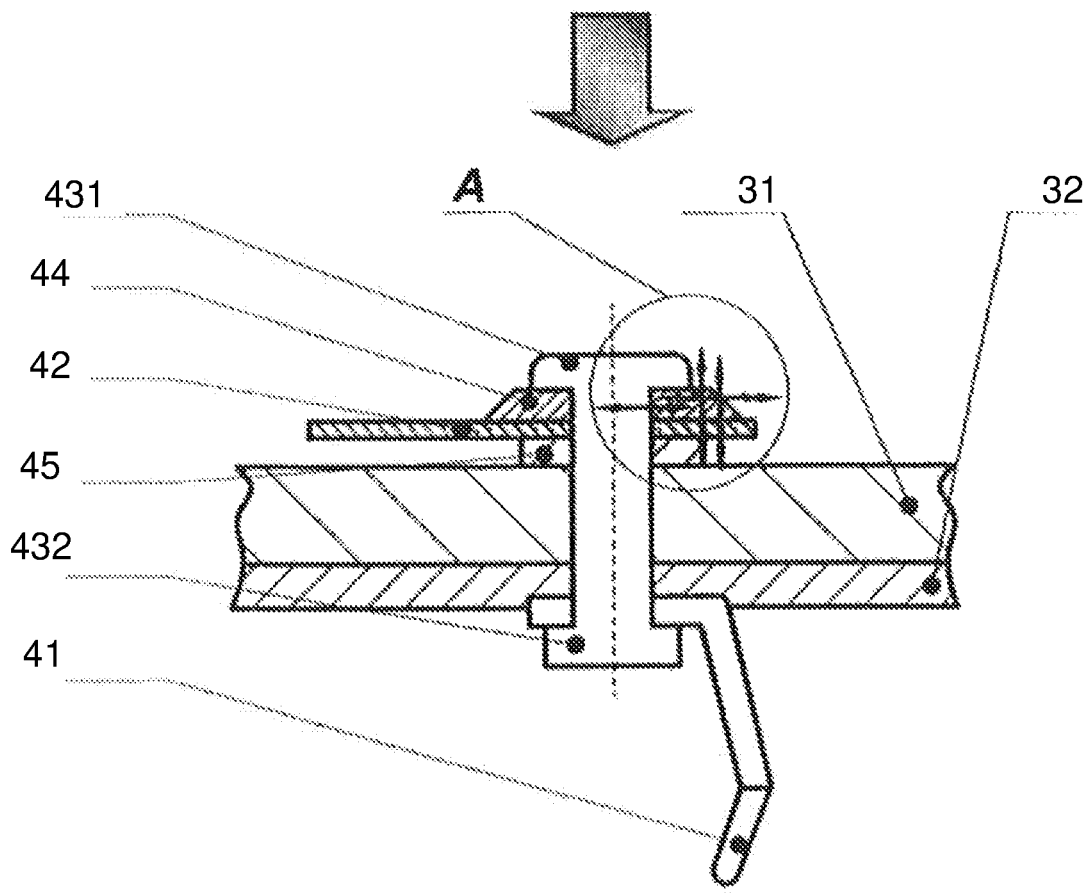
FIGS. 17A and 17B show the forming of the upper washer during a riveting process.
Figure 17B:
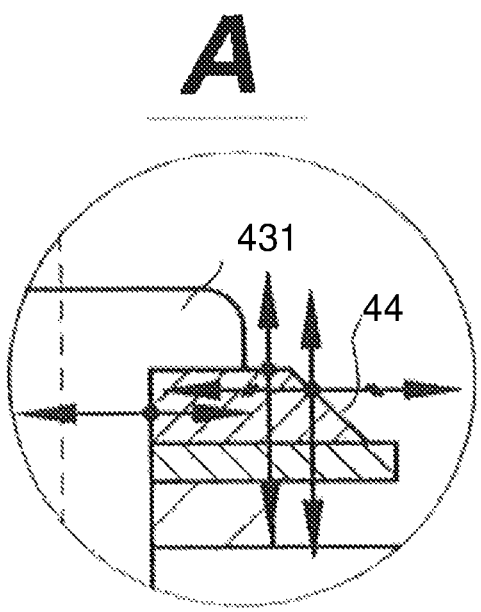

According to the first embodiment of the press machine shown in FIGS. 16A and 16B, the outer jig 210 comprises a tapered surface 211 to be pressed to the third surface 443 of the upper washer 44 during the riveting process. According to the second embodiment of the press machine shown in FIG. 16C, the outer jig 210 comprises rollers 212 to be pressed to the third surface 443 of the upper washer 44 during the riveting process. The outer jig 210 presses the upper washer 44 to the underside and presses it to the inside as well, as shown in FIGS. 17A and 17B. Consequently, the outer side surface of the upper washer 44 cannot be expanded due to the special embodiment of the outer jig 210, and the contribution to the shrinkage of the inner side surface of the upper washer 44 is increased. As a result, the adhesive properties among lead tab 42, rivet 43 and upper washer 44 in the case of tab-flower riveting and the adhesive properties among rivet 43 and upper washer 44 in the case of no tab-flower riveting can be improved.

The invention claimed is:

1. An electrolytic capacitor comprising:
    a can having an opening;
    a capacitor element being housed by the can;
    a covering element configured to close the opening of the can, the covering element having an inner surface directed to an inside of the can and an opposite outer surface directed to an outside of the can; and
    a connection element configured to externally apply an electrical signal to the capacitor element,
    wherein the connection element comprises an external terminal configured to externally apply the electrical signal and a lead tab being electrically coupled to the capacitor element and the external terminal,
    wherein the connection element comprises a rivet having a first and a second head,
    wherein the rivet penetrates the covering element so that the first head of the rivet protrudes out of the covering element at the inner surface of the covering element and the second head of the rivet protrudes out of the covering element at the outer surface of the covering element,
    wherein the rivet is configured such that the first head of the rivet fixes the lead tab to the covering element at the inner surface of the covering element and the second head of the rivet fixes the external terminal to the covering element at the outer surface of the covering element,
    wherein the connection element comprises an upper washer and a lower washer respectively having an opening, to receive the rivet,
    wherein the upper washer is placed between the lead tab and the first head of the rivet, the lower washer being placed between the lead tab and the inner surface of the covering element,
    wherein the upper washer has a first surface directed to the inside of the can, a second surface being located opposite to the first surface and directed to the inner surface of the covering element and a third surface laterally located between the first and second surfaces of the upper washer forming an outer peripheral surface of the upper washer, and
    wherein the upper washer is configured such that either the first surface of the upper washer comprises a cavity to receive the first head of the rivet, the cavity of the upper washer extending between the first surface of the upper washer and a bottom surface of the cavity in which the opening of the upper washer ends, and the lead tab extending along the second surface of the upper washer and along a side wall of the opening of the upper washer and along the bottom surface of the cavity of the upper washer, or
    wherein the second surface of the upper washer comprises a protrusion or the third surface of the upper washer has a taper such that the second surface has a larger area than the first surface of the upper washer.

2. The electrolytic capacitor as claimed in claim 1, wherein the opening of the upper washer extends from the second surface of the upper washer into the cavity of the upper washer.

3. The electrolytic capacitor as claimed in claim 1, wherein a width of the cavity of the upper washer is larger than a width of the opening of the upper washer.

4. The electrolytic capacitor as claimed in claim 1,
    wherein a depth of the cavity of the upper washer extends between the first surface of the upper washer and the bottom surface of the cavity,
    wherein a depth of the opening of the upper washer extends between the second surface of the upper washer and the bottom surface of the cavity, and
    wherein a quotient between the depth of the cavity of the upper washer and the depth of the opening of the upper washer is between 0.2 to 0.8.

5. The electrolytic capacitor as claimed in claim 1, wherein the lower washer comprises a cavity being complementarily shaped in relation to the protrusion of the upper washer.

6. The electrolytic capacitor as claimed in claim 5, wherein the upper washer and the lower washer are configured such that the lead tab is pressed into the cavity of the lower washer by the protrusion of the upper washer.

7. The electrolytic capacitor as claimed in claim 1,
wherein the second surface of the upper washer has a first area and a second area, wherein the second area forms the protrusion by protruding from the first area of the second surface of the upper washer,
wherein the opening of the upper washer extends from the first surface of the upper washer to the second area of the second surface of the upper washer,
wherein the upper washer has a first height between the first surface of the upper washer and the first area of the second surface of the upper washer,
wherein the upper washer has a second height between the first surface of the upper washer and the second area of the second surface of the upper washer, and
wherein a quotient between the first height and the second height of the upper washer is between 0.2 and 0.8.

8. The electrolytic capacitor as claimed in claim 1,
wherein the lower washer has a first surface directed to the upper washer and an opposite second surface directed to the covering element,
wherein the opening of the lower washer extends from the second surface of the lower washer to the bottom surface of the cavity,
wherein a cavity of the lower washer extends from the first surface of the lower washer to the bottom surface of the cavity,
wherein the lower washer has a first height between the bottom surface of the cavity and the second surface of the lower washer,
wherein the lower washer has a second height between the first surface of the lower washer and the second surface of the lower washer, and
wherein a quotient between the first height and the second height of the lower washer is between 0.2 and 0.8.

9. The electrolytic capacitor as claimed in claim 1, wherein the opening of the upper washer extends from the first surface of the upper washer to the second surface of the upper washer.

10. The electrolytic capacitor as claimed in claim 9, wherein the lead tab extends along the second surface of the upper washer and along a side wall of the opening of the upper washer and along the first surface of the upper washer.

11. The electrolytic capacitor as claimed in claim 1, wherein an angle between the second surface of the upper washer and the tapered third surface of the upper washer is between 20° and 80°.

12. The electrolytic capacitor as claimed in claim 1,
wherein a diameter of the upper washer along the second surface is between 3 mm and 10 mm,
wherein a diameter of the opening of the upper washer is between 2 mm and 8 mm, and
wherein a thickness of the upper washer between the first and second surface of the upper washer is between 0.3 mm and 5 mm.

13. A method to manufacture an electrolytic capacitor, the method comprising:
providing a can having an opening;
providing a capacitor element;
providing a covering element to close the opening of the can, the covering element having an inner surface directed to an inside of the can and an opposite outer surface directed to an outside of the can when closing the can;
providing a connection element for externally applying an electrical signal to the capacitor element,
wherein the connection element comprises an external terminal for applying the electrical signal and a lead tab for applying the electrical signal to the capacitor element and a rivet having a first and a second head,
wherein the rivet penetrates the covering element so that the first head of the rivet protrudes out of the covering element at the inner surface of the covering element and the second head of the rivet protrudes out of the covering element at the outer surface of the covering element,
wherein the rivet is configured such that the first head of the rivet fixes the lead tab to the covering element at the inner surface of the covering element and the second head of the rivet fixes the terminal to the covering element at the outer surface of the covering element,
wherein the connection element comprises an upper washer and a lower washer respectively having an opening to receive the rivet,
wherein the upper washer is placed between the lead tab and the first head of the rivet and the lower washer is placed between the lead tab and the inner surface of the covering element,
wherein the upper washer is formed having a first surface directed to the inside of the can, a second surface being located opposite to the first surface and directed to the inner surface of the covering element and a third surface laterally located between the first and the second surface of the upper washer, and
wherein the upper washer is configured such that the third surface is formed with a taper such that the second surface of the upper washer has a larger area than the first surface of the upper washer;
providing a press machine to fix the terminal and the lead tab at the covering element by a riveting process, wherein the press machine comprises an outer jig to fix the upper washer and an inner jig to crash the rivet and to form the first head of the rivet, and wherein the outer jig comprises one of a tapered surface or rollers to be pressed to the third surface of the upper washer during the riveting process;
inserting the capacitor element into the opening of the can; and
closing the opening of the can by the covering element.

14. An electrolytic capacitor comprising:
a can having an opening;
a capacitor element being housed by the can;
a covering element configured to close the opening of the can, the covering element having an inner surface directed to an inside of the can and an opposite outer surface directed to an outside of the can; and
a connection element configured to externally apply an electrical signal to the capacitor element,
wherein the connection element comprises an external terminal configured to externally apply the electrical signal and a lead tab being electrically coupled to the capacitor element and the external terminal,
wherein the connection element comprises a rivet having a first and a second head,
wherein the rivet penetrates the covering element so that the first head of the rivet protrudes out of the covering element at the inner surface of the covering element and the second head of the rivet protrudes out of the covering element at the outer surface of the covering element, wherein the rivet is configured such that the first head of the rivet fixes the lead tab to the covering element at the inner surface of the covering element and the second head of the rivet fixes the external terminal to the covering element at the outer surface of the covering element, wherein the connection element comprises an upper washer and a lower washer respectively having an opening, to receive the rivet, wherein the upper washer is placed between the lead tab and the first head of the rivet, the lower washer being placed between the lead tab and the inner surface of the covering element, wherein the upper washer has a first surface directed to the inside of the can, a second surface being located opposite to the first surface and directed to the inner surface of the covering element and a third surface laterally located between the first and second surfaces of the upper washer, wherein the upper washer is configured such that either the first surface of the upper washer comprises a cavity to receive the first head of the rivet or the second surface of the upper washer comprises a protrusion or the third surface of the upper washer has a taper such that the second surface has a larger area than the first surface of the upper washer, wherein the opening of the upper washer extends from the first surface of the upper washer to the second surface of the upper washer, and wherein the lead tab extends along the second surface of the upper washer and along a side wall of the opening of the upper washer and along the first surface of the upper washer.

15. The electrolytic capacitor as claimed in claim 14, wherein the opening of the upper washer extends from the second surface of the upper washer into the cavity of the upper washer.

16. The electrolytic capacitor as claimed in claim 14, wherein a width of the cavity of the upper washer is larger than a width of the opening of the upper washer.

17. The electrolytic capacitor as claimed in claim 14, wherein the lower washer comprises a cavity being complementarily shaped in relation to the protrusion of the upper washer.

18. The electrolytic capacitor as claimed in claim 17, wherein the upper washer and the lower washer are configured such that the lead tab is pressed into the cavity of the lower washer by the protrusion of the upper washer.

* * * * *